(12) United States Patent
Xu et al.

(10) Patent No.: US 12,713,314 B2
(45) Date of Patent: Aug. 18, 2026

(54) COMMUNICATION METHOD AND APPARATUS

(71) Applicant: Huawei Technologies Co., Ltd., Shenzhen (CN)

(72) Inventors: Shengfeng Xu, Beijing (CN); Yanmei Yang, Beijing (CN); Yuan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 544 days.

(21) Appl. No.: 18/165,078

(22) Filed: Feb. 6, 2023

(65) Prior Publication Data

US 2023/0189102 A1 Jun. 15, 2023

Related U.S. Application Data

(63) Continuation of application No. PCT/CN2020/108011, filed on Aug. 7, 2020.

(51) Int. Cl.
*H04W 36/00* (2009.01)
*H04W 76/14* (2018.01)
*H04W 88/04* (2009.01)

(52) U.S. Cl.
CPC .......... *H04W 36/03* (2018.08); *H04W 76/14* (2018.02); *H04W 88/04* (2013.01)

(58) Field of Classification Search
CPC ...... H04W 36/03; H04W 76/14; H04W 88/04
(Continued)

(56) References Cited

U.S. PATENT DOCUMENTS 10,326,516 B2 6/2019 Zhao
2018/0139682 A1* 5/2018 Xu ........................ H04W 40/22
(Continued)

FOREIGN PATENT DOCUMENTS

CN 105451282 A 3/2016
CN 106888494 A 6/2017
(Continued)

OTHER PUBLICATIONS

Oppo, et al., “Key Issue—Support of Relay”, SA WG2 Meeting #135, S2-1910412, Oct. 14-18, 2019, 2 Pages, Split, Croatia.
(Continued)

*Primary Examiner* — Asad M Nawaz
*Assistant Examiner* — Hugh Mark Ashley
(74) *Attorney, Agent, or Firm* — Slater Matsil, LLP

(57) ABSTRACT

A communication method and apparatus are disclosed. The method includes a first terminal device determines a candidate relay device, where the candidate relay device includes at least one relay device, and sends a first message to a second terminal device, where the first message is used to request to change a relay device, and the first message includes an identifier of the candidate relay device. In the foregoing manner, the first terminal device may determine the candidate relay device, and send the first message to the second terminal device, so that the second terminal device can determine a second relay device from the candidate relay device based on the first message. In this way, a relay device between the first terminal device and the second terminal device can be changed from a first relay device to the second relay device.

21 Claims, 6 Drawing Sheets

(58) Field of Classification Search
USPC .......................................................... 370/315
See application file for complete search history.

(56) References Cited

U.S. PATENT DOCUMENTS

| | | | | |
|---|---|---|---|---|
| 2020/0244342 | A1 | 7/2020 | Martin | |
| 2021/0282195 | A1* | 9/2021 | Paladugu | H04W 72/20 |
| 2022/0248484 | A1* | 8/2022 | Wang | H04W 76/15 |
| 2022/0303866 | A1 | 9/2022 | Zhang | |

FOREIGN PATENT DOCUMENTS

| | | | |
|---|---|---|---|
| CN | 110461020 | A | 11/2019 |
| CN | 110611944 | A | 12/2019 |
| EP | 3185612 | A1 | 6/2017 |
| WO | 2021207219 | A1 | 10/2021 |

OTHER PUBLICATIONS

"New SID: Study on System enhancement for Proximity based Services in 5GS," Source: SA WG2, Document for: Approval, Agenda Item: 19, TSG SA Meeting #SP-83, SP-190186, Mar. 20-22, 2019, Shenzhen, China, 4 pages.

Ericsson, "Solution for UE-to-UE Relay Selection Without Relay Discovery," 3GPP TSG-SA WG2 Meeting #136AH, S2-2001371, SA WG2 Temporary Document, Jan. 13-17, 2020, 4 pages, Incheon, Korea.

* cited by examiner

COMMUNICATION METHOD AND APPARATUS

CROSS-REFERENCE TO RELATED APPLICATIONS

This application is a continuation of International Application No. PCT/CN2020/108011, filed on Aug. 7, 2020, the disclosure of which is hereby incorporated by reference in its entirety.

TECHNICAL FIELD

This application relates to the field of wireless communication technologies, and in particular, to a communication method and apparatus.

BACKGROUND

With development of communication technologies, a $4^{th}$ generation (4G) communication system may support communication between devices since $3^{rd}$ generation partnership project (3GPP) Release 12. This communication manner may be referred to as device-to-device (D2D) communication. A biggest difference from a conventional cellular communication technology lies in that D2D communication allows direct communication between terminal devices.

D2D communication includes one-to-many communication and one-to-one communication. One-to-many communication corresponds to multicast and broadcast communication, and one-to-one communication corresponds to unicast communication. In one-to-one communication, if a sender terminal device and a receiver terminal device are in a short distance range, the sender terminal device may directly communicate with the receiver terminal device after mutual discovery; or if a sender terminal device is far away from a receiver terminal device, the sender terminal device may communicate with the receiver terminal device via a relay device, to extend a communication distance between the terminal devices.

However, after the sender terminal device and the receiver terminal device select a relay device (for example, a first relay device) for communication, how to change the relay device (for example, from the first relay device to a second relay device) still needs to be further studied.

SUMMARY

This application provides a communication method and apparatus, to change a relay device between a first terminal device and a second terminal device.

According to a first aspect, an embodiment of this application provides a communication method. The method may be applied to a first terminal device or a chip in the first terminal device. The first terminal device and a second terminal device perform relay communication via a first relay device. An example in which the method is applied to the first terminal device is used. In the method, the first terminal device determines a candidate relay device, where the candidate relay device includes at least one relay device; and sends a first message to the second terminal device, where the first message is used to request to change a relay device, and the first message includes an identifier of the candidate relay device.

In the foregoing manner, the first terminal device may determine the candidate relay device, and send the first message to the second terminal device, so that the second terminal device can determine a second relay device from the candidate relay device based on the first message. In this way, a relay device between the first terminal device and the second terminal device can be changed from the first relay device to the second relay device.

In a possible design, the sending a first message to the second terminal device includes sending the first message to the second terminal device via the first relay device.

In a possible design, the first message further includes a status of a signal between the candidate relay device and the first terminal device and/or an address of the candidate relay device.

In a possible design, the determining a candidate relay device includes determining, based on a status of a signal between a third terminal device and the first terminal device, that the candidate relay device includes the third terminal device, where the signal status includes signal quality and/or signal strength.

In a possible design, the determining, based on a status of a signal between a third terminal device and the first terminal device, that the candidate relay device includes the third terminal device includes determining, based on the status of the signal between the third terminal device and the first terminal device and a status of a signal between the first relay device and the first terminal device, that the candidate relay device includes the third terminal device; or determining, based on the status of the signal between the third terminal device and the first terminal device, a status of a signal between the first relay device and the first terminal device, and a status of a communication link between the third terminal device and the second terminal device, that the candidate relay device includes the third terminal device, where the communication link status includes there is the communication link or there is no communication link.

In a possible design, the method further includes obtaining the status of the signal between the third terminal device and the first terminal device.

In a possible design, the obtaining the status of the signal between the third terminal device and the first terminal device includes sending a third message, where the third message is used to discover a relay device; receiving a fourth message from the third terminal device, where the fourth message is used to respond to the third message; and determining the status of the signal between the third terminal device and the first terminal device based on the fourth message.

In a possible design, the obtaining the status of the signal between the third terminal device and the first terminal device includes receiving a fifth message from the third terminal device, where the fifth message indicates that the third terminal device supports relay communication; and determining the status of the signal between the third terminal device and the first terminal device based on the fifth message.

In a possible design, the method further includes obtaining the status of the communication link between the third terminal device and the second terminal device.

In a possible design, the obtaining the status of the communication link between the third terminal device and the second terminal device includes receiving the fifth message from the third terminal device, where the fifth message includes an identifier of the second terminal device, and the fifth message indicates that the third terminal device supports relay communication and there is the communication link between the third terminal device and the second terminal device; and determining the status of the communication link between the third terminal device and the second terminal device based on the fifth message.

According to a second aspect, an embodiment of this application provides a communication method. The method may be applied to a third terminal device or a chip in the third terminal device. An example in which the method is applied to the third terminal device is used. In the method, the third terminal device obtains an identifier of at least one terminal device that has a communication link with the third terminal device; and sends a fifth message, where the fifth message includes the identifier of the at least one terminal device, and the fifth message indicates that the third terminal device supports relay communication and there is the communication link between the third terminal device and the at least one terminal device.

According to a third aspect, an embodiment of this application provides a communication method. The method may be applied to a second terminal device or a chip in the second terminal device. The second terminal device and a first terminal device perform relay communication via a first relay device. An example in which the method is applied to the second terminal device is used. In the method, the second terminal device receives a first message from the first terminal device, where the first message is used to request to change a relay device, the first message includes an identifier of a candidate relay device, and the candidate relay device includes at least one relay device; and sends indication information to the first terminal device based on the first message, where the indication information indicates to change a relay device between the second terminal device and the first terminal device to a second relay device, and the candidate relay device includes the second relay device.

In the foregoing manner, the second terminal device receives the first message from the first terminal device, and may determine the second relay device from the candidate relay device based on the first message. In this way, the relay device between the first terminal device and the second terminal device can be changed from the first relay device to the second relay device. In addition, in this manner, because the first message includes the identifier of the candidate relay device, the second terminal device can directly learn which devices are candidate relay devices. In this way, from a perspective of the relay device, forwarding of a broadcast message by the relay device can be effectively avoided, thereby effectively saving resources. From a perspective of the second terminal device, a broadcast message of the relay device does not need to be received to identify which devices are candidate relay devices, so that processing burden of the second terminal device can be effectively reduced.

In a possible design, the candidate relay device includes at least two relay devices, and the method further includes determining the second relay device based on statuses of signals between the at least two relay devices and the second terminal device.

In a possible design, the sending indication information to the first terminal device includes sending the indication information to the first terminal device based on a status of a signal between the second relay device and the second terminal device and a status of a signal between the first relay device and the second terminal device.

In this manner, the indication information can be sent to the first terminal device only when the status of the signal between the second relay device and the second terminal device is better than the status of the signal between the first relay device and the second terminal device, to ensure that transmission performance of the changed relay device is better than transmission performance of the original relay device.

In a possible design, the candidate relay device includes at least two relay devices, and the first message further includes a status of a signal between the candidate relay device and the first terminal device; and the method further includes determining the second relay device based on the status of the signal between the candidate relay device and the first terminal device and a status of a signal between the candidate relay device and the second terminal device.

In this manner, the second terminal device selects the second relay device by comprehensively considering the status of the signal between the candidate relay device and the first terminal device and the status of the signal between the candidate relay device and the second terminal device, so that relay transmission performance of the selected second relay device is good.

In a possible design, the method further includes obtaining the status of the signal between the candidate relay device and the second terminal device.

In a possible design, the obtaining the status of the signal between the candidate relay device and the second terminal device includes broadcasting a request message, where the request message includes an identifier of a first candidate relay device, and the first candidate relay device is any relay device in the candidate relay device; receiving a response message from the first candidate relay device; and determining a status of a signal between the first candidate relay device and the second terminal device based on the response message.

In a possible design, the first message further includes an address of the candidate relay device; and the obtaining the status of the signal between the candidate relay device and the second terminal device includes sending a request message to a second candidate relay device based on an address of the second candidate relay device, where the second candidate relay device is any relay device in the candidate relay device; receiving a response message from the second candidate relay device; and determining a status of a signal between the second candidate relay device and the second terminal device based on the response message.

In a possible design, the obtaining the status of the signal between the candidate relay device and the second terminal device includes receiving a fifth message from a third candidate relay device, where the fifth message indicates that the third candidate relay device supports relay communication, and the third candidate relay device is any relay device in the candidate relay device; and determining a status of a signal between the third candidate relay device and the second terminal device based on the fifth message.

It should be noted that the methods described in the first aspect, the second aspect, and the third aspect correspond to each other. For beneficial effects of related technical features in the methods described in the various aspects, refer to each other. Details are not described again.

According to a fourth aspect, an embodiment of this application provides a communication method. The method may be applied to a first terminal device or a chip in the first terminal device. The first terminal device and a second terminal device perform relay communication via a first relay device. An example in which the method is applied to the first terminal device is used. In the method, the first terminal device obtains a status of communication between the first terminal device and the first relay device; and sends a sixth message based on the communication status, where the sixth message is used to request to change a relay device.

In this manner, the first terminal device may broadcast the sixth message based on the communication status, to further trigger a candidate relay device to send a seventh message to the second terminal device, so that the second terminal device can determine a second relay device from the candidate relay device. In this way, a relay device between the first terminal device and the second terminal device can be changed from the first relay device to the second relay device.

In a possible design, the sixth message includes a relay reselection indication, and the relay reselection indication indicates to change the relay device.

In a possible design, the sixth message includes a signal status requirement and/or a quality of service QoS requirement.

In a possible design, the method includes determining the signal status requirement based on a status of a signal between the first terminal device and the first relay device; and/or determining the QoS requirement based on QoS that a communication link between the first terminal device and the first relay device can meet.

In a possible design, the sending a sixth message based on the communication status includes sending the sixth message after determining that the status of the signal between the first terminal device and the first relay device does not meet a preset condition; sending the sixth message based on the QoS that the communication link between the first terminal device and the first relay device can meet and a QoS requirement of a communication service between the first terminal device and the second terminal device; or sending the sixth message based on the status of the signal between the first terminal device and the first relay device, a preset condition, the QoS that the communication link between the first terminal device and the first relay device can meet, and a QoS requirement of a communication service between the first terminal device and the second terminal device.

In a possible design, the method further includes receiving first indication information from the second terminal device via a second relay device, where the first indication information indicates to change a relay device between the second terminal device and the first terminal device to the second relay device; or receiving second indication information from the second terminal device via the first relay device, where the second indication information indicates to change a relay device between the second terminal device and the first terminal device to the second relay device.

According to a fifth aspect, an embodiment of this application provides a communication method. The method may be applied to a first candidate relay device or a chip in the first candidate relay device. An example in which the method is applied to the first candidate relay device is used. In the method, the first candidate relay device receives a sixth message from a first terminal device, where the sixth message is used to request to change a relay device; and sends a seventh message based on the sixth message, where the seventh message includes a status of a signal between the first candidate relay device and the first terminal device.

In a possible design, the sixth message includes a relay reselection indication, and the relay reselection indication indicates to change the relay device. The sending a seventh message based on the sixth message includes including the status of the signal between the first candidate relay device and the first terminal device in the seventh message based on the relay reselection indication; and sending the seventh message.

In a possible design, the sixth message includes a signal status requirement and/or a QoS requirement. The sending a seventh message based on the sixth message includes sending the seventh message when the status of the signal between the first candidate relay device and the first terminal device meets the signal status requirement in the sixth message; sending the seventh message when QoS corresponding to the status of the signal between the first candidate relay device and the first terminal device meets the QoS requirement in the sixth message; or sending the seventh message when the status of the signal between the first candidate relay device and the first terminal device meets the signal status requirement in the sixth message, and QoS corresponding to the status of the signal between the first candidate relay device and the first terminal device meets the QoS requirement in the sixth message.

In this manner, because the sixth message includes the signal status requirement and/or the QoS requirement, a terminal device that receives the sixth message may send the seventh message when the signal status requirement and/or the QoS requirement are/is met, and may not send the seventh message when the signal status requirement and/or the QoS requirement are/is not met. In this way, some terminal devices that are not suitable for serving as candidate relay devices can be prevented from sending the seventh message, thereby effectively reducing signaling overheads.

In a possible design, the method further includes receiving indication information from a second terminal device; and sending the indication information to the first terminal device, where the indication information indicates to change a relay device between the second terminal device and the first terminal device to the first candidate relay device.

According to a sixth aspect, an embodiment of this application provides a communication method. The method may be applied to a second terminal device or a chip in the second terminal device. The second terminal device and a first terminal device perform relay communication via a first relay device. An example in which the method is applied to the second terminal device is used. In the method, the second terminal device receives a seventh message from a candidate relay device, where the seventh message includes a status of a signal between the candidate relay device and the first terminal device; and sends indication information to the first terminal device based on the status of the signal between the candidate relay device and the first terminal device and a status of a signal between the candidate relay device and the second terminal device, where the indication information indicates to change a relay device between the first terminal device and the second terminal device to a second relay device, and the candidate relay device includes the second relay device.

In a possible design, the candidate relay device includes at least two relay devices.

In a possible design, the candidate relay device further includes the first relay device.

In a possible design, the sending indication information to the first terminal device includes sending the indication information to the first terminal device via the second relay device; or sending the indication information to the first terminal device via the first relay device.

It should be noted that the methods described in the fourth aspect, the fifth aspect, and the sixth aspect correspond to each other. For beneficial effects of related technical features in the methods described in the various aspects, refer to each other. Details are not described again.

According to a seventh aspect, an embodiment of this application provides a communication apparatus. The communication apparatus may be a terminal device. (for example, the first terminal device in the first aspect, the third terminal device in the second aspect, the second terminal device in the third aspect, the first terminal device in the fourth aspect, the first candidate relay device in the fifth aspect, or the second terminal device in the sixth aspect) or a chip disposed inside the terminal device. The communication apparatus has a function of implementing any one of the first aspect to the sixth aspect. For example, the communication apparatus includes a corresponding module, unit, or means for performing steps in any one of the first aspect to the sixth aspect. The function, unit, or means may be implemented by using software, implemented by using hardware, or implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to receive configuration information from the terminal device. The processing unit may be configured to perform some internal operations of the communication apparatus.

In another possible design, the communication apparatus includes a processor, and may further include a transceiver. The transceiver is configured to receive and send a signal, and the processor executes program instructions, to complete the method in any one of the possible designs or implementations of the first aspect to the sixth aspect. The communication apparatus may further include one or more memories. The memory is configured to be coupled to the processor, and the memory may store a necessary computer program or instructions for implementing the function in any one of the first aspect to the sixth aspect. The processor may execute the computer program or the instructions stored in the memory. When the computer program or the instructions are executed, the communication apparatus is enabled to implement the method in any one of the possible designs or implementations of the first aspect to the sixth aspect.

In another possible design, the communication apparatus includes a processor, and the processor may be configured to be coupled to a memory. The memory may store a necessary computer program or instructions for implementing the function in any one of the first aspect to the sixth aspect. The processor may execute the computer program or the instructions stored in the memory. When the computer program or the instructions are executed, the communication apparatus is enabled to implement the method in any one of the possible designs or implementations of the first aspect to the sixth aspect.

In another possible design, the communication apparatus includes a processor and an interface circuit. The processor is configured to communicate with another apparatus by using the interface circuit, and perform the method in any one of the possible designs or implementations of the first aspect to the sixth aspect.

It may be understood that, in the seventh aspect, the processor may be implemented by using hardware, or may be implemented by using software. When the processor is implemented by using the hardware, the processor may be a logic circuit, an integrated circuit, or the like; or when the processor is implemented by using the software, the processor may be a general-purpose processor, and is implemented by reading software code stored in the memory. In addition, there may be one or more processors, and one or more memories. The memory may be integrated with the processor, or the memory and the processor are disposed separately. In a specific implementation process, the memory and the processor may be integrated into one chip, or may be disposed on different chips. A type of the memory and a manner in which the memory and the processor are disposed are not limited in embodiments of this application.

According to an eighth aspect, an embodiment of this application provides a communication system. The communication system includes the first terminal device in the first aspect, the third terminal device in the second aspect, and the second terminal device in the third aspect.

According to a ninth aspect, an embodiment of this application provides a communication system. The communication system includes the first terminal device in the fourth aspect, the first candidate relay device in the fifth aspect, and the second terminal device in the sixth aspect.

According to a tenth aspect, this application provides a computer-readable storage medium. The computer storage medium stores computer-readable instructions; and when a computer reads and executes the computer-readable instructions, the computer is enabled to perform the method in any one of the possible designs of the first aspect to the sixth aspect.

According to an eleventh aspect, this application provides a computer program product; and when a computer reads and executes the computer program product, the computer is enabled to perform the method in any one of the possible designs of the first aspect to the sixth aspect.

According to a twelfth aspect, this application provides a chip. The chip includes a processor, and the processor is coupled to a memory, and is configured to read and execute a software program stored in the memory, to implement the method in any one of the possible designs of the first aspect to the sixth aspect.

These aspects or other aspects of this application are more readily apparent from the following description of embodiments.

DETAILED DESCRIPTION OF ILLUSTRATIVE EMBODIMENTS

The following clearly describes the technical solutions in embodiments of this application with reference to the accompanying drawings in embodiments of this application.

Figure 1:
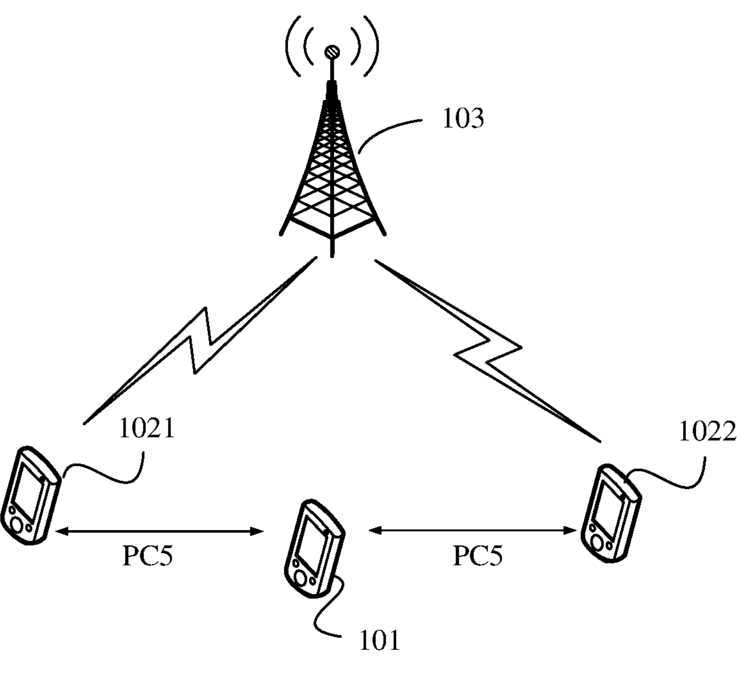
FIG. 1 is a schematic diagram of a network architecture to which an embodiment of this application is applicable.

FIG. 1 is a schematic diagram of a network architecture to which an embodiment of this application is applicable. As shown in FIG. 1, the network architecture may include one or more terminal devices (for example, a terminal device 1021 and a terminal device 1022) and one or more relay devices (for example, a relay device 101). Communication, that is, device-to-device (D2D) communication, may be performed between the terminal device 1021 and the terminal device 1022.

For example, the terminal device 1021 may send data to the terminal device 1022. In this case, the terminal device 1021 may be referred to as a sender terminal device or a source terminal device, and the terminal device 1022 may be referred to as a receiver terminal device or a target terminal device. For another example, the terminal device 1022 may send data to the terminal device 1021. In this case, the terminal device 1022 may be referred to as a sender terminal device or a source terminal device, and the terminal device 1021 may be referred to as a receiver terminal device or a target terminal device.

Further, when the terminal device 1021 and the terminal device 1022 are in a short distance range, the terminal device 1021 may directly communicate with the terminal device 1022 after mutual discovery. For example, a connection may be established between the terminal device 1021 and the terminal device 1022 based on a proximity communication 5 (PC5) interface, and communicate with each other by using the connection, where the connection may be referred to as a PC5 connection, a PC5 link, or a PC5 communication link. When the terminal device 1021 is far away from the terminal device 1022, the terminal device 1021 may communicate with the terminal device 1022 via the relay device (for example, the relay device 101). To be specific, a first connection may be established between the terminal device 1021 and the relay device 101 based on a PC5 interface, and a second connection may be established between the relay device 101 and the terminal device 1022 based on the PC5 interface, so that the terminal device 1021 can communicate with the terminal device 1022 by using the first connection and the second connection. For example, the relay device 101 may forward, to the terminal device 1022, data received from the terminal device 1021, and forward, to the terminal device 1021, data received from the terminal device 1022.

It should be understood that a quantity of terminal devices and a quantity of relay devices in the network architecture are not limited in this embodiment of this application. In addition to the terminal device and the relay device, the network architecture may further include another device, for example, an access network device 103. The terminal device 1021 or the terminal device 1022 may alternatively communicate with the access network device 103 over an air interface. This is not limited in this embodiment of this application.

The following separately describes the terminal device, the relay device, and the access network device in detail.

1. Terminal Device

The terminal device may also be referred to as user equipment (UE), and includes a device that provides a user with voice and/or data connectivity, for example, may include a handheld device with a wireless connection function, or a processing device connected to a wireless modem. The terminal device may communicate with a core network via a radio access network (RAN), and exchange a voice and/or data with the RAN. The terminal device may include a wireless terminal device, a mobile terminal device, a device-to-device (D2D) communication terminal device, a vehicle-to-everything (V2X) terminal device, a machine-to-machine/machine-type communication (M2M/MTC) terminal device, an internet of things (IoT) terminal device, a subscriber unit, a subscriber station, a mobile station, a remote station, an access point (AP), a remote terminal, an access terminal, a user terminal, a user agent, user equipment, or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communications service (PCS) phone, a cordless phone, a session initiation protocol (SIP) phone, a wireless local loop (WLL) station, or a personal digital assistant (PDA). The terminal device further includes a limited device, for example, a device having low power consumption, a device having a limited storage capability, or a device having a limited computing capability. For example, the terminal device includes an information sensing device, for example, a barcode, radio frequency identification (RFID), a sensor, a global positioning system (GPS), or a laser scanner.

In embodiments of this application, an apparatus configured to implement a function of the terminal device may be a terminal device, or may be an apparatus that can support the terminal device in implementing the function, for example, a chip system, or a combined component or device that can implement the function of the terminal device. The apparatus may be installed in the terminal device. In embodiments of this application, the chip system may include a chip, or may include a chip and another discrete component. In the technical solutions provided in embodiments of this application, descriptions are provided by using an example in which the apparatus configured to implement the function of the terminal device is the terminal device.

2. Relay Device

The relay device may be a terminal device that supports relay communication (to be specific, supports forwarding of communication data between a source terminal device and a target terminal device) or another possible device. This is not specifically limited. It should be noted that the relay device in embodiments of this application is a relay device between terminal devices, and is different from a relay device between a terminal device and an access network device.

In embodiments of this application, an apparatus configured to implement a function of the relay device may be a relay device, or may be an apparatus that can support the relay device in implementing the function, for example, a chip system, or a combined component or device that can implement the function of the relay device. The apparatus may be installed in the relay device. In the technical solutions provided in embodiments of this application, descriptions are provided by using an example in which the apparatus configured to implement the function of the relay device is the relay device.

3. Access Network Device

The access network device is a node or a device that connects a terminal device to a radio network, and the access network device may also be referred to as a base station. For example, the access network device includes but is not limited to a next generation NodeB (generation NodeB, gNB) in a 5G communication system, an evolved NodeB (eNB), a radio network controller (RNC), a NodeB (NB), a base station controller (BSC), a base transceiver station (base transceiver station, BTS), a home evolved NodeB ((HeNB) or (home NodeB, HNB)), a baseband unit (BBU), a transmission reception point (TRP), a transmission point (TP), or a mobile switching center.

The network architecture shown in FIG. 1 is applicable to communication systems of various radio access technologies (RATs), for example, a 4G (or referred to as long term evolution (LTE)) communication system, or a 5G (or referred to as new radio (NR)) communication system. Alternatively, the communication system may be a future communication system. The network architecture and the service scenario described in embodiments of this application are intended to describe the technical solutions in embodiments of this application more clearly, and do not constitute a limitation on the technical solutions provided in embodiments of this application. A person of ordinary skill in the art may know that, with evolution of the communication network architecture and emergence of new service scenarios, the technical solutions provided in embodiments of this application are also applicable to similar technical problems.

In the network architecture shown in FIG. 1, the two terminal devices may communicate with each other via the relay device. Specifically, the two terminal devices may first discover and select the relay device, and then each establish a PC5 connection to the selected relay device.

Figure 2:
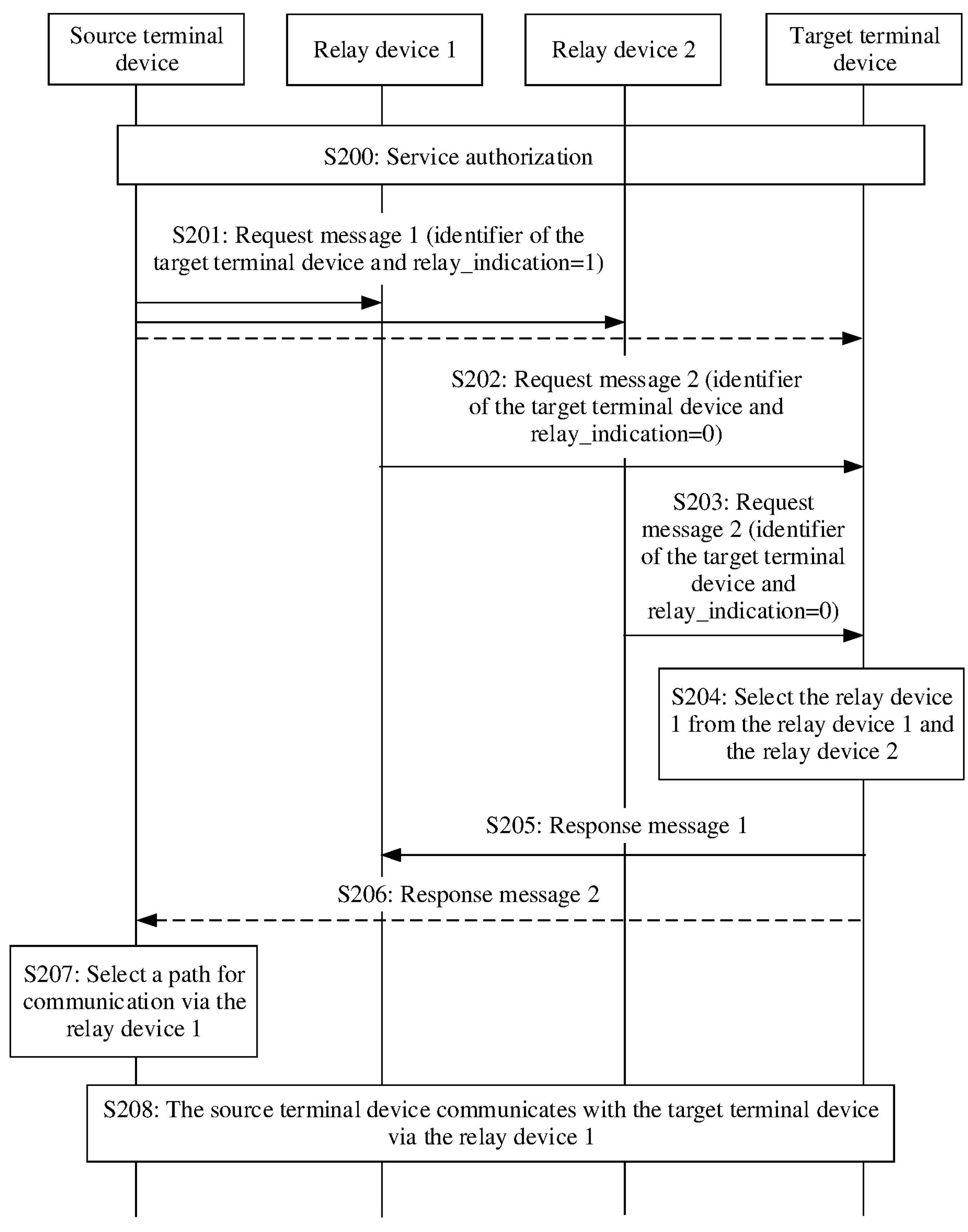
FIG. 2 is a schematic flowchart of discovering and selecting a relay device.

The following describes an implementation of discovering and selecting the relay device. FIG. 2 is a schematic flowchart of discovering and selecting a relay device. Refer to FIG. 2. The procedure may include the following steps.

S200: After a terminal device successfully registers with a core network, the core network may perform service authorization on the terminal device. For example, the core network authorizes the terminal device to perform communication in a relay manner, and subsequently the terminal device may serve as a sender terminal device or a receiver terminal device. For another example, the core network authorizes the terminal device to support relay communication, and subsequently the terminal device may serve as a relay device.

S201: A source terminal device sends a request message 1, where the request message 1 may include an identifier of a target terminal device and relay indication information (relay_indication=1).

Herein, when a terminal device 1 determines that the terminal device 1 needs to communicate with a terminal device 2 via the relay device, the terminal device 1 may serve as the source terminal device, and send the request message 1 to the terminal device 2 serving as the target terminal device. The request message 1 may be sent in a broadcast manner. The identifier of the target terminal device included in the request message 1 may be an application layer identifier of the target terminal device. The relay indication information indicates a quantity of relay devices that need to be selected between the source terminal device and the target terminal device. For example, if relay_indication=1, it indicates that one relay device needs to be selected between the source terminal device and the target terminal device.

S202: Another terminal device (for example, a relay device 1) around the source terminal device may receive the request message 1, and send a request message 2 based on the request message 1, where the request message 2 may include the identifier of the target terminal device and relay indication information (relay_indication=0).

S203: Another terminal device (for example, a relay device 2) around the source terminal device may receive the request message 1, and send a request message 2 based on the request message 1, where the request message 2 may include the identifier of the target terminal device and relay indication information (relay_indication=0).

Herein, after receiving the request message 1, the another terminal device (for example, the relay device 1 or the relay device 2) around the source terminal device discovers that in the request message 1, relay_indication=1 (greater than 0), and the another terminal device supports relay communication. In this case, the another terminal device may set relay_indication to 0, and send the request message 2. After receiving the request message 1, another terminal device (for example, a terminal device 3) around the source terminal device discovers that in the request message 1, relay_indication=1, but the another terminal device does not support relay communication. In this case, the another terminal device may perform no processing (for example, may not send the request message 2).

S204: After receiving the request message 2 sent by the relay device 1 and the request message 2 sent by the relay device 2, the target terminal device may select one relay device from the relay device 1 and the relay device 2, for example, select the relay device 1.

S205: The target terminal device returns a response message 1 to the source terminal device via the relay device 1.

S206: If the target terminal device also receives the request message 1 sent by the source terminal device, after discovering that the identifier of the target terminal device in the request message 1 is an identifier of the target terminal device, the target terminal device may directly return a response message 2 to the source terminal device.

S207: The source terminal device may receive the response message 1 and the response message 2. In other words, the source terminal device may have two paths for communicating with the target terminal device, to be specific, an indirect communication path (indirect path) for communication via the relay device 1 and a direct communication path (direct path). Further, the source terminal device may select one path from the indirect communication path and the direct communication path. For example, the source terminal device selects the indirect communication path.

S208: The source terminal device communicates with the target terminal device via the relay device 1.

Herein, the source terminal device may establish a PC5 connection to the relay device 1, and the target terminal device may establish a PC5 connection to the relay device 1. Further, the source terminal device communicates with the target terminal device via the relay device 1.

In addition, if the source terminal device selects the direct communication path in S207, the source terminal device may establish a PC5 connection to the target terminal device, and further directly communicate with the target terminal device. Alternatively, the source terminal device may directly communicate with the target terminal device, or may communicate with the target terminal device via the relay device 1.

It should be noted that, in FIG. 2, each of the request message 1 and the request message 2 may be referred to as a discovery request message, a solicitation message, a direct communication request message, or another possible name, and each of the response message 1 and the response message 2 may be referred to as a request accept message, a direct communication accept message, or another possible name. This is not specifically limited. When each of the request message 1 and the request message 2 is the discovery request message or the solicitation message, each of the response message 1 and the response message 2 may be the request accept message. When each of the request message 1 and the request message 2 is the direct communication request message, each of the response message 1 and the response message 2 may be the direct communication accept message.

Figure 3:
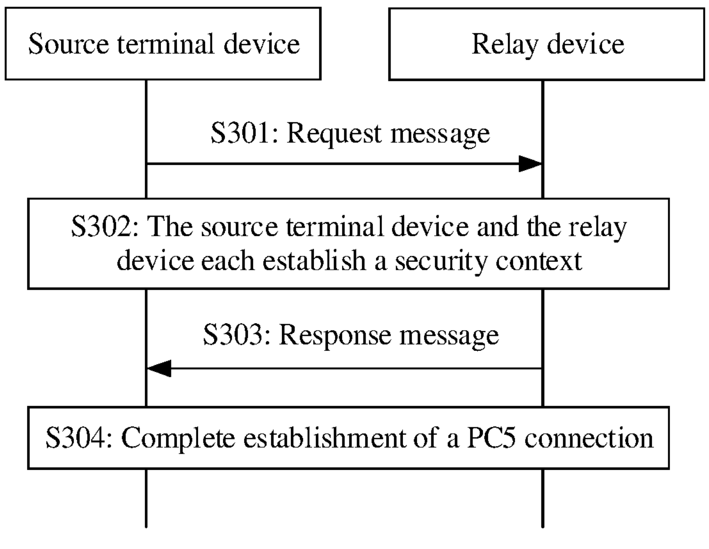
FIG. 3 is a schematic flowchart of establishing a PC5 connection.

The following describes an implementation of establishing the PC5 connection. An example in which a source terminal device establishes a PC5 connection to a relay device (for example, the relay device 1 selected in FIG. 2) is used. FIG. 3 is a schematic flowchart of establishing a PC5 connection. Refer to FIG. 3. The procedure may include the following steps.

S301: The source terminal device sends a request message to the relay device.

Herein, the source terminal device may obtain an address of the relay device in the procedure described in FIG. 2. For example, the source terminal device receives a response message 1 returned by the relay device 1, where the response message 1 may include an address of the relay device 1. Further, the source terminal device may obtain the address of the relay device 1 based on the response message 1. Further, the source terminal device may send the request message to the relay device based on the address of the relay device, where the request message may include a source address (to be specific, an address of the source terminal device) and a destination address (to be specific, the address of the relay device). It should be noted that the address in this embodiment of this application may be a layer-2 identifier (layer-2 identifier) or a layer-2 address.

S302: The source terminal device and the relay device each establish a security context.

S303: The relay device sends a response message to the source terminal device.

Herein, the response message may include the source address (to be specific, the address of the relay device) and the destination address (to be specific, the address of the source terminal device). Optionally, the source terminal device and the relay device may further determine, through negotiation, a quality of service (QoS) parameter by using the request message and the response message.

S304: The source terminal device and the relay device complete establishment of the PC5 connection, to transmit data to each other. In addition, the source terminal device and the relay device may further allocate a PC5 connection identifier (PC5 link identifier) to identify the PC5 connection.

It should be noted that, in FIG. 3, the request message may be referred to as the direct communication request message, a unicast establishment request message, or another possible name, and the response message may be referred to as the direct communication accept message, a unicast establishment accept message, or another possible name.

Considering that the relay device may need to be changed when the source terminal device communicates with a target terminal device via the relay device, how to change the relay device is studied in embodiments of this application. It should be noted that, in embodiments of this application, changing the relay device may alternatively be replaced with another possible description, for example, reselecting a relay device, or updating the relay device.

The following describes in detail embodiments of this application with reference to Embodiment 1 and Embodiment 2.

Embodiment 1

Figure 4:
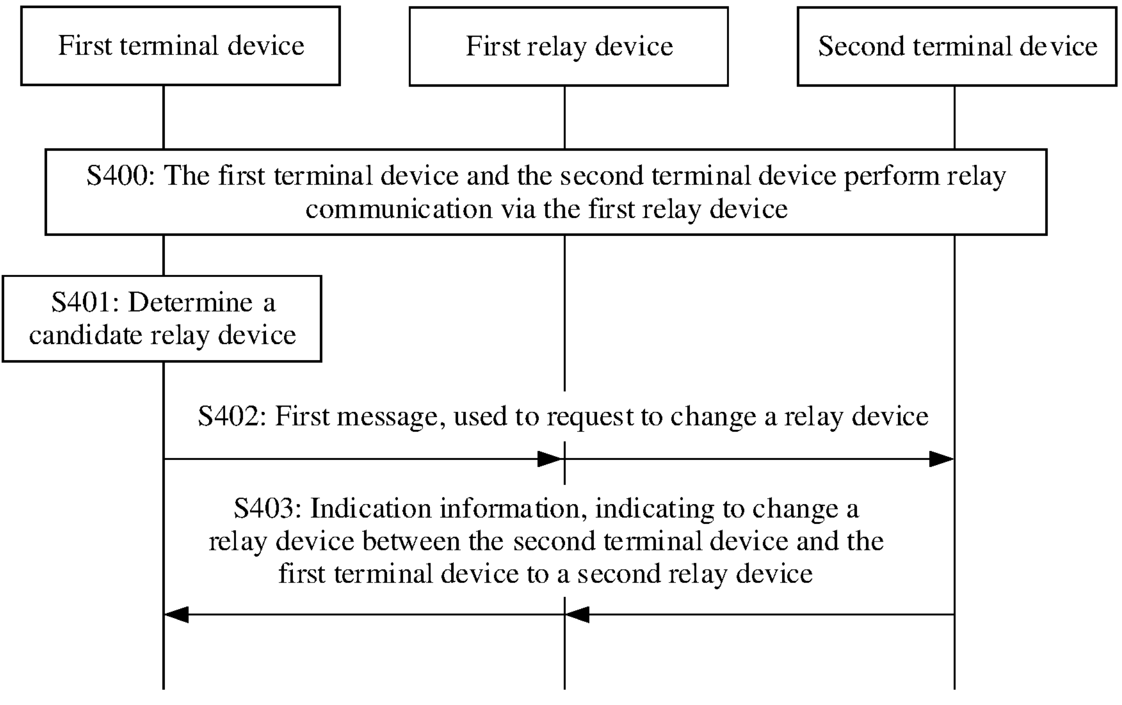
FIG. 4 is a schematic flowchart corresponding to a communication method according to Embodiment 1 of this application.

FIG. 4 is a schematic flowchart corresponding to a communication method according to Embodiment 1 of this application. As shown in FIG. 4, the method includes the following steps.

5400: A first terminal device and a second terminal device perform relay communication via a first relay device.

Herein, the first terminal device may be a source terminal device, and the second terminal device may be a target terminal device. For example, the first terminal device and the second terminal device may select the first relay device by using the procedure shown in FIG. 2, the first terminal device may establish a PC5 connection to the first relay device by using the procedure shown in FIG. 3, and the second terminal device may establish a PC5 connection to the first relay device by using the procedure shown in FIG. 3.

S401: The first terminal device determines a candidate relay device.

Herein, the candidate relay device may include at least one relay device. Further, the candidate relay device may include at least one relay device other than the first relay device.

For example, there may be a plurality of implementations in which the first terminal device determines the candidate relay device. The following describes several possible implementations.

Implementation 1

The first terminal device sends a third message, where the third message is used to discover a relay device, and the third message may be sent in a broadcast manner. After receiving the third message, another terminal device (for example, a third terminal device) around the first terminal device may send a fourth message to the first terminal device if determining that the another terminal device supports relay communication, where the fourth message is used to respond to the third message. Further, the fourth message may indicate that the third terminal device supports relay communication. In addition, the third terminal device may perform no processing (for example, may not feed back the fourth message) if determining that the third terminal device does not support relay communication. Correspondingly, the first terminal device receives the fourth message from the third terminal device, and may determine a status of a signal between the third terminal device and the first terminal device based on the fourth message. For example, the third message may be a newly designed message dedicated to discovering the relay device. For example, the third message may be referred to as a solicitation message or a discovery message. The fourth message may be a newly designed message dedicated to responding to the third message. For example, the fourth message may be referred to as a response message. There may be a plurality of cases in which the first terminal device sends the third message. For example, after determining that a relay device needs to be changed, the first terminal device sends the third message. For example, the first terminal device may obtain a status of communication between the first terminal device and the first relay device, and further determine, based on the communication status, that the relay device needs to be changed. For details, refer to descriptions in Embodiment 2.

Further, the first terminal device may determine, based on the status of the signal between the third terminal device and the first terminal device, that the candidate relay device includes the third terminal device.

For example, the first terminal device may determine, based on the status of the signal between the third terminal device and the first terminal device and a status of a signal between the first relay device and the first terminal device, that the candidate relay device includes the third terminal device. The signal status may include signal quality and/or signal strength. For example, the signal quality may be reference signal received quality (RSRQ), and the signal strength may be reference signal received power (RSRP) or a received signal strength indication (RSSI). In the following, an example in which the signal status includes the signal strength is used for description. For example, if strength of the signal between the third terminal device and the first terminal device is greater than strength of the signal between the first relay device and the first terminal device, the first terminal device may determine that the candidate relay device includes the third terminal device. If strength of the signal between the third terminal device and the first terminal device is less than or equal to strength of the signal between the first relay device and the first terminal device, the first terminal device may determine that the candidate relay device does not include the third terminal device.

For another example, if the first terminal device determines that the status of the signal between the third terminal device and the first terminal device meets a first preset condition, the first terminal device may determine that the candidate relay device includes the third terminal device. If the first terminal device determines that the status of the signal between the third terminal device and the first terminal device does not meet a first preset condition, the first terminal device may determine that the candidate relay device does not include the third terminal device. For example, that the status of the signal between the third terminal device and the first terminal device meets the first preset condition may include the following. The strength of the signal between the third terminal device and the first terminal device is greater than a first threshold. Correspondingly, that the status of the signal between the third terminal device and the first terminal device does not meet the first preset condition may include the strength of the signal between the third terminal device and the first terminal device is less than or equal to a first threshold. The first threshold may be pre-configured by an access network device or a core network device for the first terminal device. In this case, it may be understood as that selection of the relay device is controlled by a network, and the third terminal device can serve as the relay device only when the strength of the signal between the third terminal device and the first terminal device is greater than the first threshold. Alternatively, the first threshold may be generated by the first terminal device based on a QoS requirement of a communication service between the first terminal device and the second terminal device. In this case, there is a correspondence between signal strength and a transmission rate. For example, better signal strength indicates a higher corresponding transmission rate. Therefore, in an example, the first terminal device may generate a signal strength requirement based on a transmission rate requirement in the QoS requirement (where for example, the transmission rate requirement is 10 Mbps, and generated signal strength is −50 dBm), and further determine the first threshold (where for example, the first threshold is −50 dBm) based on the signal strength requirement. Alternatively, the first threshold may be predefined in a protocol. This is not specifically limited.

Implementation 2

A third terminal device sends a fifth message, where the fifth message indicates that the third terminal device supports relay communication, and the fifth message may be sent in a broadcast manner. For example, the fifth message may be referred to as an announcement message. For example, after determining that the third terminal device supports relay communication, the third terminal device may periodically send the fifth message. Another terminal device (for example, the first terminal device) around the third terminal device may receive the fifth message, and may determine a status of a signal between the third terminal device and the first terminal device based on the fifth message.

Optionally, the fifth message may further indicate that there is a communication link between the third terminal device and at least one terminal device. There may be a plurality of manners in which the fifth message indicates that there is the communication link between the third terminal device and the at least one terminal device. For example, the fifth message may include an identifier of the at least one terminal device. In this case, after receiving the fifth message, the first terminal device may further determine, based on the identifier of the at least one terminal device in the fifth message, that there is the communication link between the third terminal device and the at least one terminal device. Herein, the at least one terminal device may include a terminal device a. That there is a communication link between the third terminal device and the terminal device a may mean that there is a PC5 communication link or a PC5 connection between the third terminal device and the terminal device a; there is a path, for communication via the relay device, between the third terminal device and the terminal device a; or there is a path, for communication via a core network or a server, between the third terminal device and the terminal device a. In this embodiment of this application, the first one is mainly used as an example for description.

Further, the first terminal device may determine, based on the status of the signal between the third terminal device and the first terminal device, that the candidate relay device includes the third terminal device.

For example, the first terminal device may determine, based on the status of the signal between the third terminal device and the first terminal device and a status of a signal between the first relay device and the first terminal device, that the candidate relay device includes the third terminal device. For details, refer to the descriptions in Implementation 1.

For another example, the first terminal device may determine, based on the status of the signal between the third terminal device and the first terminal device and a first threshold, that the candidate relay device includes the third terminal device. For details, refer to the descriptions in Implementation 1.

For another example, if the fifth message includes the identifier of the at least one terminal device, the first terminal device may determine, based on the status of the signal between the third terminal device and the first terminal device and a status of a communication link between the third terminal device and the second terminal device, that the candidate relay device includes the third terminal device. The communication link status may include there is the communication link or there is no communication link. If the first terminal device determines that the fifth message includes an identifier of the second terminal device, the first terminal device may determine that there is the communication link between the third terminal device and the second terminal device. If the first terminal device determines that the fifth message does not include an identifier of the second terminal device, the first terminal device may determine that there is no communication link between the third terminal device and the second terminal device. For example, if strength of the signal between the third terminal device and the first terminal device is greater than or equal to strength of the signal between the first relay device and the first terminal device, and there is the communication link between the third terminal device and the second terminal device, the first terminal device may determine that the candidate relay device includes the third terminal device; otherwise (to be specific, strength of the signal between the third terminal device and the first terminal device is less than strength of the signal between the first relay device and the first terminal device, and/or there is no communication link between the third terminal device and the second terminal device), the first terminal device may determine that the candidate relay device does not include the third terminal device. For another example, if strength of the signal between the third terminal device and the first terminal device is greater than or equal to the first threshold, and there is the communication link between the third terminal device and the second terminal device, the first terminal device may determine that the candidate relay device includes the third terminal device; otherwise (to be specific, strength of the signal between the third terminal device and the first terminal device is less than the first threshold, and/or there is no communication link between the third terminal device and the second terminal device), the first terminal device may determine that the candidate relay device does not include the third terminal device. In this way, in this manner, the third terminal device that has the communication link (namely, a PC5 connection) with the second terminal device is determined as the candidate relay device, so that when the third terminal device is subsequently selected as a relay device between the first terminal device and the second terminal device, the third terminal device may no longer need to establish a PC5 connection to the second terminal device, to improve efficiency and reduce signaling overheads.

Implementation 3

In addition to having a communication link with the foregoing first relay device, the first terminal device may further have a communication link with another terminal device (for example, a third terminal device). In this case, the first terminal device may receive communication data from the third terminal device, and further determine a status of a signal between the third terminal device and the first terminal device based on the communication data. A direct communication path may be established between the third terminal device and the first terminal device, and the third terminal device may send the communication data to the first terminal device. Alternatively, the third terminal device may be a relay device between the first terminal device and another terminal device (for example, a fourth terminal device). Then, after receiving communication data from the fourth terminal device, the third terminal device may forward the communication data to the first terminal device.

Further, the first terminal device may determine, based on the status of the signal between the third terminal device and the first terminal device, that the candidate relay device includes the third terminal device.

For example, the first terminal device may determine, based on the status of the signal between the third terminal device and the first terminal device and a status of a signal between the first relay device and the first terminal device, that the candidate relay device includes the third terminal device. For details, refer to the descriptions in Implementation 1.

For another example, the first terminal device may determine, based on the status of the signal between the third terminal device and the first terminal device and a first threshold, that the candidate relay device includes the third terminal device. For details, refer to the descriptions in Implementation 1.

It should be noted that: (1) There may be a PC5 communication link or there may be no PC5 communication link between the third terminal device and the first terminal device in Implementation 1 or Implementation 2, and there may be a PC5 communication link between the third terminal device and the first terminal device in Implementation 3. In addition to Implementation 1, Implementation 2, and Implementation 3, the first terminal device may further determine the status of the signal between the third terminal device and the first terminal device in another manner. This is not specifically limited. (2) The candidate relay device may be determined by the first terminal device in at least one of Implementation 1, Implementation 2, and Implementation 3.

S402: The first terminal device sends a first message to the second terminal device, where the first message is used to request to change the relay device. Correspondingly, the second terminal device may receive the first message.

Herein, the first message may be a newly designed message. For example, the first message may be referred to as a relay change request message or a relay reselection request message. Then, the second terminal device may determine that the first message is used to request to change the relay device. In this case, it may be understood as that the first message requests, in an explicit manner, to change the relay device. Further, the first message may include an identifier of the candidate relay device. Alternatively, the first message is an existing message, for example, a discovery message, and the first message may include an identifier of the candidate relay device. Further, after receiving the first message, the second terminal device may determine, based on the identifier of the candidate relay device, that the first message is used to request to change the relay device. In this case, it may be understood as that the first message requests, in an implicit manner, to change the relay device. Alternatively, the first message is an existing message, the first message may include a relay reselection indication and an identifier of the candidate relay device, and the relay reselection indication indicates to change the relay device. Further, after receiving the first message, the second terminal device may determine, based on the relay reselection indication, that the first message is used to request to change the relay device. In this case, it may be understood as that the first message requests, in an explicit manner, to change the relay device. Optionally, the first message may further include a status of a signal between the candidate relay device and the first terminal device and/or an address of the candidate relay device.

For example, the first terminal device may send the first message to the second terminal device via the first relay device, where the first message may be a unicast message. Specifically, the first terminal device sends the first message to the first relay device by using a PC5 connection between the first terminal device and the first relay device. Further, the first relay device forwards the first message to the second terminal device by using a PC5 connection between the first relay device and the second terminal device. Alternatively, if there is a direct communication path between the first terminal device and the second terminal device, the first terminal device may directly send the first message to the second terminal device.

S403: The second terminal device sends indication information to the first terminal device based on the first message, where the indication information indicates to change the relay device between the second terminal device and the first terminal device to a second relay device, and the candidate relay device includes the second relay device.

Herein, that the indication information indicates to change the relay device between the second terminal device and the first terminal device to a second relay device may alternatively be described as follows. The indication information indicates to update the relay device between the second terminal device and the first terminal device to the second relay device; the indication information indicates that the second terminal device and the first terminal device perform relay communication via the second relay device; or the indication information indicates to reselect the relay device between the second terminal device and the first terminal device as the second relay device.

For example, the second terminal device may directly send the indication information to the first terminal device, and this corresponds to a case in which there is a direct communication connection between the second terminal device and the first terminal device. For example, the indication information may be carried by using PC5-S (PC5-Signaling) signaling such as a link modification request message. Alternatively, the second terminal device may send the indication information to the second terminal device via the first relay device. For example, the second terminal device sends the indication information to the first relay device by using the PC5 connection between the second terminal device and the first relay device. The first relay device forwards the indication information to the first terminal device by using the PC5 connection between the first relay device and the first terminal device, where the indication information may be carried in a relay change response message or a response message. Alternatively, the second terminal device may send the indication information to the second terminal device via the second relay device. For example, the second terminal device sends a direct communication request message to the second relay device, and the second relay device sends the direct communication request message to the first terminal device, where the direct communication request message includes the indication information. If the second terminal device directly sends the indication information to the first terminal device, or sends the indication information to the first terminal device via the first relay device, the indication information may include an identifier of the second relay device. If the second terminal device sends the indication information to the first terminal device via the second relay device, the indication information may no longer include an identifier of the second relay device. The first terminal device receives the indication information from the second relay device, and may learn that the indication information indicates to change the relay device between the second terminal device and the first terminal device to the second relay device.

As described above, the candidate relay device includes at least one relay device, which is separately described below.

(1) If the candidate relay device includes one relay device (for example, the second relay device), the second terminal device may send the indication information to the first terminal device based on a status of a signal between the second relay device and the second terminal device and a status of a signal between the first relay device and the second terminal device. For example, if strength of the signal between the second relay device and the second terminal device is greater than strength of the signal between the first relay device and the second terminal device, the indication information may be sent to the first terminal device. If strength of the signal between the second relay device and the second terminal device is less than or equal to strength of the signal between the first relay device and the second terminal device, no processing may be performed, for example, the indication information is not sent to the first terminal device, or a response message of the first message is sent to the first terminal device, where the response message indicates not to change the relay device between the second terminal device and the first terminal device.

(2) If the candidate relay devices include at least two relay devices, the second terminal device may select or determine one relay device (for example, the second relay device) from the at least two relay devices. There may be a plurality of manners in which the second terminal device determines the second relay device. For example, the second terminal device may determine the second relay device based on statuses of signals between the at least two relay devices and the second terminal device. In this case, strength of a signal between the second relay device and the second terminal device is greater than or equal to strength of a signal between another relay device in the at least two relay devices and the second terminal device. After determining the second relay device in this manner, the second terminal device may send the indication information to the first terminal device based on a status of the signal between the second relay device and the second terminal device and a status of a signal between the first relay device and the second terminal device. For another example, if the first message may further include the status of the signal between the candidate relay device and the first terminal device, the second terminal device may determine the second relay device based on the statuses of the signals between the at least two relay devices and the second terminal device and the status of the signal between the candidate relay device and the first terminal device. In this case, strength of a signal between the second relay device and the first terminal device is greater than the strength of the signal between the first relay device and the first terminal device, and strength of the signal between the second relay device and the second terminal device is greater than strength of the signal between the first relay device and the second terminal device; a sum of strength of a signal between the second relay device and the first terminal device and strength of the signal between the second relay device and the second terminal device is greater than a sum of the strength of the signal between the first relay device and the first terminal device and strength of the signal between the first relay device and the second terminal device; or strength of a signal between the second relay device and the first terminal device is greater than the strength of the signal between the first relay device and the first terminal device, and QoS corresponding to strength of the signal between the second relay device and the second terminal device meets the QoS requirement of the communication service between the second terminal device and the first terminal device. After determining the second relay device in this manner, the second terminal device may send the indication information to the first terminal device.

In the foregoing (1) or (2), there may be a plurality of manners in which the second terminal device obtains a status of a signal between the candidate relay device and the second terminal device. For example, after receiving the first message, the second terminal device may broadcast a request message, where the request message includes the identifier of the candidate relay device; receive a response message from a first candidate relay device, where the first candidate relay device is any relay device in the candidate relay device; and further determine a status of a signal between the first candidate relay device and the second terminal device based on the response message. In this case, the candidate relay device may be determined by the first terminal device in Implementation 1 and/or Implementation 3. It should be noted that, for the request message herein, after receiving the request message, if a terminal device determines that the request message includes an identifier of the terminal device, the terminal device may feed back the response message; otherwise, the terminal device may perform no processing (to be specific, may not feed back the response message).

For another example, if the first message includes the address of the candidate relay device, after receiving the first message, the second terminal device may send a request message to a second candidate relay device based on an address of the second candidate relay device, where the request message may be sent in a unicast manner. A source address of the request message is an address of the second terminal device, and a destination address of the request message is the address of the second candidate relay device. The second candidate relay device is any relay device in the candidate relay device. In addition, the second terminal device receives a response message from the second candidate relay device, and determines a status of a signal between the second candidate relay device and the second terminal device based on the response message. In this case, the candidate relay device may be determined by the first terminal device in Implementation 1 and/or Implementation 3.

For another example, the second terminal device receives a fifth message from a third candidate relay device, where the fifth message indicates that the third candidate relay device supports relay communication, and the third candidate relay device is any relay device in the candidate relay device; and determines a status of a signal between the third candidate relay device and the second terminal device based on the fifth message. In this case, the candidate relay device may be determined by the first terminal device in Implementation 2.

In the foregoing manner, the first terminal device may determine the candidate relay device, and the second terminal device determines the second relay device from the candidate relay device. In this way, the relay device between the first terminal device and the second terminal device can be changed from the first relay device to the second relay device. In addition, in this manner, because the first terminal device may send the identifier of the candidate relay device to the second terminal device, the second terminal device can directly learn which devices are candidate relay devices. In this way, from a perspective of the relay device, forwarding of a broadcast message by the relay device (where for example, the relay device 1 and the relay device 2 need to forward the broadcast message in FIG. 2) can be effectively avoided, thereby effectively saving resources. From a perspective of the second terminal device, a broadcast message of the relay device does not need to be received to identify which devices are candidate relay devices, so that processing burden of the second terminal device can be effectively reduced. In addition, because the first terminal device considers a plurality of factors (for example, the status of the signal between the candidate relay device and the first terminal device) when determining the candidate relay device, the determined candidate relay device is appropriate. Because the second terminal device also considers a plurality of factors (for example, the status of the signal between the second relay device and the second terminal device) when determining the second relay device from the candidate relay device, transmission performance of the selected second relay device is good.

Embodiment 2

Figure 5:
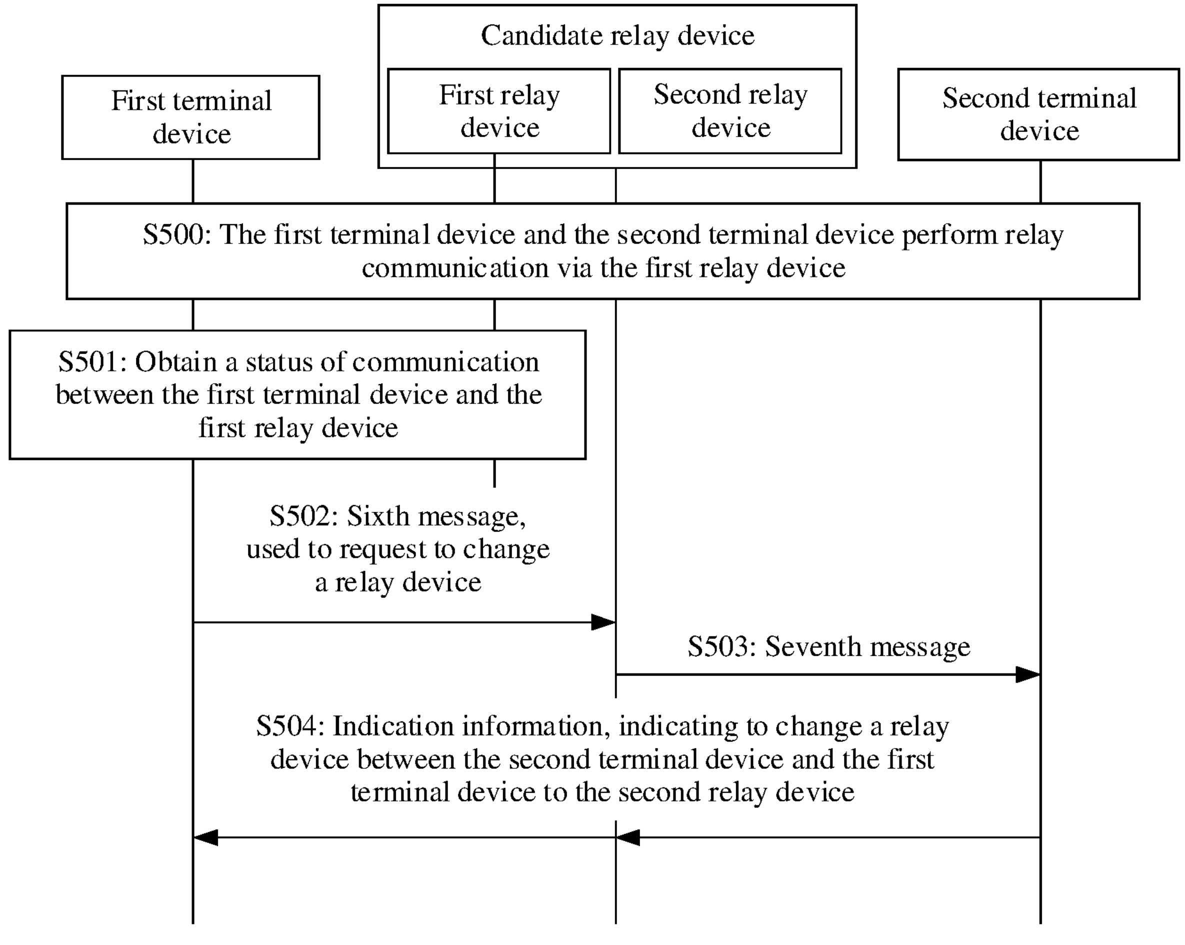
FIG. 5 is a schematic flowchart corresponding to a communication method according to Embodiment 2 of this application.

FIG. 5 is a schematic flowchart corresponding to a communication method according to Embodiment 2 of this application. As shown in FIG. 5, the method includes the following steps.

S500: A first terminal device and a second terminal device perform relay communication via a first relay device.

Herein, for S500, refer to S400 in Embodiment 1.

S501: The first terminal device obtains a status of communication between the first terminal device and the first relay device.

Herein, the communication status may include a signal status and/or QoS that a communication link can meet.

For example, there may be a plurality of manners in which the first terminal device obtains the status of the signal between the first terminal device and the first relay device. For example, reference may be made to the manner in which the first terminal device obtains the status of the signal between the first terminal device and the third terminal device in Embodiment 1. Details are not described again.

There may be a plurality of manners in which the first terminal device obtains the QoS that the communication link between the first terminal device and the first relay device can meet. For example, the first terminal device may determine, based on a transmission rate between the first terminal device and the first relay device, the QoS that the communication link between the first terminal device and the first relay device can meet. For another example, the first terminal device uses, based on the status of the signal between the first terminal device and the third terminal device, QoS corresponding to the signal status as the QoS that the communication link between the first terminal device and the first relay device can meet. For example, if the QoS that the communication link between the first terminal device and the first relay device can meet includes a transmission rate supported by the communication link between the first terminal device and the first relay device, the transmission rate supported by the communication link may be determined based on strength of the signal between the first terminal device and the first relay device.

S502: The first terminal device sends a sixth message based on the communication status, where the sixth message is used to request to change a relay device (or, the sixth message is used to change the relay device). The sixth message may be sent in a broadcast manner.

Herein, if the first terminal device determines, based on the communication status, that a relay device between the first terminal device and the second terminal device needs to be changed, the first terminal device may send the sixth message.

For example, the first terminal device determines, based on the QoS that the communication link between the first terminal device and the first relay device can meet and a QoS requirement of a communication service between the first terminal device and the second terminal device, that the relay device between the first terminal device and the second terminal device needs to be changed. For example, if the first terminal device determines that the transmission rate supported by the communication link between the first terminal device and the first relay device cannot meet a transmission rate requirement of the communication service between the first terminal device and the second terminal device, the first terminal device determines that the relay device between the first terminal device and the second terminal device needs to be changed.

For another example, if the first terminal device determines that the status of the signal between the first terminal device and the first relay device does not meet a second preset condition, the first terminal device determines that the relay device between the first terminal device and the second terminal device needs to be changed. If the first terminal device determines that the status of the signal between the first terminal device and the first relay device meets a second preset condition, the relay device between the first terminal device and the second terminal device may not need to be changed. That the status of the signal between the first terminal device and the first relay device does not meet the second preset condition may include as follows. The strength of the signal between the first terminal device and the first relay device is less than or equal to a second threshold. Correspondingly, that the status of the signal between the first terminal device and the first relay device meets the second preset condition may include the strength of the signal between the first terminal device and the first relay device is greater than a second threshold. The second threshold may be pre-configured by an access network device or a core network device for the first terminal device. In this case, it may be understood as that whether to change the relay device is controlled by a network. The first relay device can be changed only when the strength of the signal between the first terminal device and the first relay device is less than or equal to the second threshold. Alternatively, the second threshold may be generated by the first terminal device based on the QoS requirement of the communication service between the first terminal device and the second terminal device. Alternatively, the second threshold may be predefined in a protocol. This is not specifically limited.

For another example, the first terminal device determines, based on the status of the signal between the first terminal device and the first relay device, the second preset condition, the QoS that the communication link between the first terminal device and the first relay device can meet, and the QoS requirement of the communication service between the first terminal device and the second terminal device, whether the relay device between the first terminal device and the second terminal device needs to be changed. For example, if the first terminal device determines that the QoS that the communication link between the first terminal device and the first relay device can meet cannot meet the QoS requirement of the communication service between the first terminal device and the second terminal device, and the status of the signal between the first terminal device and the first relay device does not meet the second preset condition, the first terminal device may determine that the relay device between the first terminal device and the second terminal device needs to be changed; otherwise, the first terminal device may determine that the relay device between the first terminal device and the second terminal device does not need to be changed.

S503: Another terminal device (for example, a candidate relay device) around the first terminal device receives the sixth message, and sends a seventh message based on the sixth message. Correspondingly, the second terminal device receives the seventh message from the candidate relay device.

Herein, the candidate relay device may include at least one relay device other than the first relay device. For example, because the first relay device may also receive the sixth message, the candidate relay device may further include the first relay device. In other words, the candidate relay device may include at least two relay devices.

For example, the sixth message may be the request message (for example, the request message 1 in FIG. 2) described above, and the sixth message may include an identifier of the second terminal device and relay indication information (relay_indication=1). Further, the sixth message may include at least one of a relay reselection indication, a signal state requirement, and a QoS requirement.

For example, in an example, the sixth message may further include a relay reselection indication. Further, after receiving the sixth message, a first candidate relay device (where the first candidate relay device may be any relay device in the candidate relay device) may determine, based on the relay reselection indication, that the sixth message is used to request to change the relay device, further include a status of a signal between the first candidate relay device and the first terminal device in the seventh message, and send the seventh message. That is, the seventh message may include the identifier of the second terminal device, relay indication information (relay_indication=0), and the status of the signal between the first candidate relay device and the first terminal device.

In another example, the sixth message may further include a signal status requirement. The first terminal device may determine the signal status requirement based on the status of the signal between the first terminal device and the first relay device. For example, the signal status requirement is the strength of the signal between the first terminal device and the first relay device. In this case, after receiving the sixth message, a first candidate relay device may determine whether a status of a signal between the first candidate relay device and the first terminal device meets the signal status requirement. If the signal status meets the signal status requirement (to be specific, strength of the signal between the first candidate relay device and the first terminal device is greater than the strength of the signal between the first terminal device and the first relay device), the first candidate relay device may include the status of the signal between the first candidate relay device and the first terminal device in the seventh message, and send the seventh message. That is, the seventh message may include the identifier of the second terminal device, relay indication information (relay_indication=0), and the status of the signal between the first candidate relay device and the first terminal device. If the signal status does not meet the signal status requirement (to be specific, strength of the signal between the first candidate relay device and the first terminal device is less than or equal to the strength of the signal between the first terminal device and the first relay device), the first candidate relay device may no longer send the seventh message.

Alternatively, the sixth message may further include a QoS requirement. The first terminal device may determine the QoS requirement based on the QoS that the communication link between the first terminal device and the first relay device can meet. For example, the QoS requirement is the QoS that the communication link between the first terminal device and the first relay device can meet. In this case, after receiving the sixth message, a first candidate relay device may determine whether QoS corresponding to a status of a signal between the first candidate relay device and the first terminal device meets the QoS requirement (for example, whether a transmission rate corresponding to the status of the signal between the first candidate relay device and the first terminal device meets a transmission rate requirement in the QoS requirement). If the QoS meets the QoS requirement (to be specific, the QoS corresponding to the status of the signal between the first candidate relay device and the first terminal device is greater than the QoS that the communication link between the first terminal device and the first relay device can meet), the first candidate relay device includes the status of the signal between the first candidate relay device and the first terminal device in the seventh message, and sends the seventh message. If the QoS does not meet the QoS requirement (to be specific, the QoS corresponding to the status of the signal between the first candidate relay device and the first terminal device is less than or equal to the QoS that the communication link between the first terminal device and the first relay device can meet), the first candidate relay device may no longer send the seventh message.

Alternatively, the sixth message may further include a signal status requirement and a QoS requirement. In this case, after receiving the sixth message, a first candidate relay device may determine whether a status of a signal between the first candidate relay device and the first terminal device meets the signal status requirement, and whether QoS corresponding to the status of the signal between the first candidate relay device and the first terminal device meets the QoS requirement (for example, whether a transmission rate corresponding to status of the signal between the first candidate relay device and the first terminal device meets a transmission rate requirement in the QoS requirement). If the status of the signal between the first candidate relay device and the first terminal device meets the signal status requirement, and the QoS corresponding to the status of the signal between the first candidate relay device and the first terminal device meets the QoS requirement, the first candidate relay device includes the status of the signal between the first candidate relay device and the first terminal device in the seventh message, and sends the seventh message; otherwise, the first candidate relay device may no longer send the seventh message.

In the foregoing example, because the sixth message includes the signal status requirement and/or the QoS requirement, a terminal device that receives the sixth message may send the seventh message when the signal status requirement and/or the QoS requirement are/is met, and may not send the seventh message when the signal status requirement and/or the QoS requirement are/is not met. In this way, some terminal devices that are not suitable for serving as candidate relay devices can be prevented from sending the seventh message, thereby effectively reducing signaling overheads.

It should be noted that, in another possible implementation, the sixth message may also be a newly designed message dedicated to requesting to change the relay device, and the sixth message may include at least one of a relay reselection indication, a signal status requirement, and a QoS requirement.

S504: The second terminal device sends indication information to the first terminal device based on a status of a signal between the candidate relay device and the first terminal device and a status of a signal between the candidate relay device and the second terminal device.

Herein, the indication information may indicate to change the relay device between the first terminal device and the second terminal device to a second relay device, and the candidate relay device includes the second relay device.

For example, after receiving the seventh message from the candidate relay device, the second terminal device may determine the status of the signal between the candidate relay device and the second terminal device based on the seventh message, and further determine the second relay device based on the status of the signal between the candidate relay device and the first terminal device and the status of the signal between the candidate relay device and the second terminal device. In this case, strength of a signal between the second relay device and the first terminal device is greater than the strength of the signal between the first relay device and the first terminal device, and strength of a signal between the second relay device and the second terminal device is greater than strength of a signal between the first relay device and the second terminal device; a sum of strength of a signal between the second relay device and the first terminal device and strength of a signal between the second relay device and the second terminal device is greater than a sum of the strength of the signal between the first relay device and the first terminal device and strength of a signal between the first relay device and the second terminal device; or strength of a signal between the second relay device and the first terminal device is greater than the strength of the signal between the first relay device and the first terminal device, and a transmission rate corresponding to strength of a signal between the second relay device and the second terminal device meets a transmission rate requirement in the QoS requirement of the communication service between the second terminal device and the first terminal device. After determining the second relay device in this manner, the second terminal device may send the indication information to the first terminal device.

There may be a plurality of manners in which the second terminal device sends the indication information to the first terminal device. For example, the second terminal device may directly send the indication information to the first terminal device. Alternatively, the second terminal device may send the indication information to the second terminal device via the first relay device. Alternatively, the second terminal device may send the indication information to the second terminal device via the second relay device. For details, refer to S403 in Embodiment 1. Details are not described again.

In the foregoing manner, after determining that the relay device needs to be changed, the first terminal device may broadcast the sixth message, and further trigger the candidate relay device to send the seventh message to the second terminal device, so that the second terminal device can determine the second relay device from the candidate relay device. In this way, the relay device between the first terminal device and the second terminal device can be changed from the first relay device to the second relay device. In addition, because the second terminal device considers a plurality of factors (for example, a status of the signal between the second relay device and the second terminal device) when determining the second relay device from the candidate relay device, relay transmission performance of the selected second relay device is better than that of the first relay device.

Embodiment 3

In Embodiment 1 and Embodiment 2, an example in which one relay device is included between the first terminal device and the second terminal device is used to describe how to change the relay device between the first terminal device and the second terminal device. It may be understood that the method in embodiments of this application is also applicable to a scenario in which a plurality of relay devices are included between the first terminal device and the second terminal device. A possible implementation is described below by using an example in which the method described in Embodiment 2 is applicable to a scenario in which two relay devices are included between the first terminal device and the second terminal device.

Figure 6:
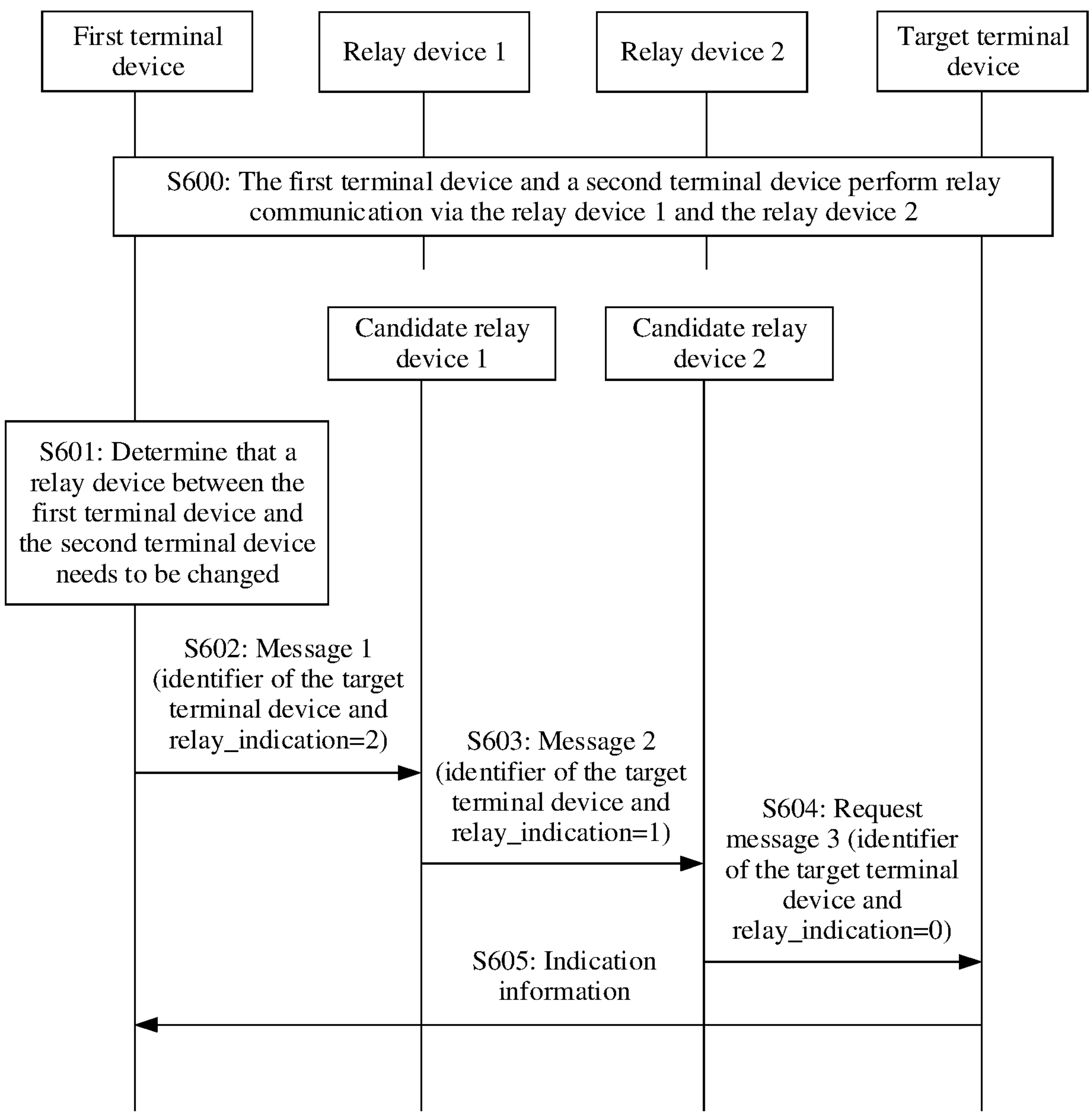
FIG. 6 is a schematic flowchart corresponding to a communication method according to Embodiment 3 of this application.

FIG. 6 is a schematic flowchart corresponding to a communication method according to Embodiment 3 of this application. As shown in FIG. 6, the method may include the following steps.

S600: A first terminal device and a second terminal device perform relay communication via a relay device 1 and a relay device 2.

For example, a PC5 connection 1 is established between the first terminal device and the relay device 1, a PC5 connection 2 is established between the relay device 1 and the relay device 2, and a PC5 connection 3 is established between the relay device 2 and the second terminal device. That the first terminal device sends data to the second terminal device is used as an example. The first terminal device may send the data to the relay device 1 by using the PC5 connection 1. After receiving the data, the relay device 1 sends the data to the relay device 2 by using the PC5 connection 2. After receiving the data, the relay device 2 sends the data to the second terminal device by using the PC5 connection 3.

S601: The first terminal device determines that a relay device between the first terminal device and the second terminal device needs to be changed.

Herein, there may be a plurality of cases in which the first terminal device determines that the relay device between the first terminal device and the second terminal device needs to be changed. For example, refer to Embodiment 2. After obtaining a status of communication between the first terminal device and the relay device 1, the first terminal device determines, based on the communication status, that the relay device between the first terminal device and the second terminal device needs to be changed.

S602: The first terminal device sends a message 1, where the message 1 is used to request to change the relay device. The message 1 may be sent in a broadcast manner.

For example, the message 1 may be the discovery request message described above, and the message 1 may include an identifier of the second terminal device and relay indication information (relay_indication=2). Further, the message 1 may include at least one of a relay reselection indication, a signal state requirement, and a QoS requirement.

S603: After receiving the message 1, a candidate relay device 1 may send a message 2. The message 2 may be sent in a broadcast manner.

Herein, the message 2 may include the identifier of the second terminal device, relay indication information (relay_indication=1), and a status of a signal between the candidate relay device 1 and the first terminal device, and may further include at least one of a relay reselection indication, the signal status requirement, and the QoS requirement.

For a related implementation in which the candidate relay device 1 sends the message 2 based on the message 1, refer to the related implementation in which the first candidate relay device sends the seventh message based on the sixth message. Details are not described again.

S604: After receiving the message 2 from the candidate relay device 1, a candidate relay device 2 may send a message 3 based on the message 2. The message 3 may be sent in a broadcast manner.

Herein, the message 3 includes the identifier of the second terminal device, relay indication information (relay_indication=0), the status of the signal between the candidate relay device 1 and the first terminal device, and a status of a signal between the candidate relay device 2 and the candidate relay device 1.

For a related implementation in which the candidate relay device 2 sends the message 3 based on the message 2, refer to the related implementation in which the first candidate relay device sends the seventh message based on the sixth message. Details are not described again.

S605: After receiving the message 3 sent by the candidate relay device 2, the second terminal device may send indication information to the first terminal device based on a status of a signal between the second terminal device and the candidate relay device 2, the status of the signal between the candidate relay device 2 and the candidate relay device 1, and the status of the signal between the candidate relay device 1 and the first terminal device. For example, the indication information may indicate to change the relay devices between the first terminal device and the second terminal device to the candidate relay device 1 and the candidate relay device 2.

It should be noted that the foregoing procedure is described by using the candidate relay device 1 and the candidate relay device 2 as examples. During specific implementation, in addition to receiving the message 3 sent by the candidate relay device 2, the second terminal device may further receive messages 3 sent by a plurality of other candidate relay devices. The second terminal device may select one path from a plurality of paths. For example, the second terminal device selects a path for communication via the candidate relay device 1 and the candidate relay device 2, and may further send the indication information to the first terminal device.

There may be a plurality of manners in which the second terminal device selects one path from a plurality of paths. For example, the second terminal device may select one path by comprehensively considering a status of a signal between two adjacent devices on each path (for example, the status of the signal between the second terminal device and the candidate relay device 2, the status of the signal between the candidate relay device 2 and the candidate relay device 1, and the status of the signal between the candidate relay device 1 and the first terminal device), for example, select a path 1. A sum of strength of signals between two adjacent devices on the path 1 is greater than a sum of strength of signals between two adjacent devices on another path in the plurality of paths, or strength of a signal between two adjacent devices on the path 1 is greater than a preset threshold. Details are not described.

In the foregoing manner, when a plurality of relay devices are included between the first terminal device and the second terminal device, flexible changing of the relay device may also be implemented.

For the foregoing Embodiment 1, Embodiment 2, and Embodiment 3, it should be noted that the following.

(1) Embodiment 1, Embodiment 2, and Embodiment 3 focus on describing differences between different embodiments. For content other than the differences, Embodiment 1, Embodiment 2, and Embodiment 3 may be mutually referenced. In addition, different implementations of the same embodiment may also be mutually referenced.

(2) Step numbers in the flowcharts described in the foregoing embodiments are merely an example of an execution procedure, and do not constitute any limitation on an execution sequence of the steps. In embodiments of this application, there is no strict execution sequence between steps that do not have a time sequence dependency relationship with each other. In addition, not all the steps shown in the flowcharts are mandatory steps, and some steps may be added to or deleted from the flowcharts based on an actual requirement.

The foregoing mainly describes the solutions provided in embodiments of this application from a perspective of the device interaction. It may be understood that to implement the foregoing functions, each device may include a corresponding hardware structure and/or software module for implementing each function. A person skilled in the art should be easily aware that, in embodiments of this application, the units and algorithm steps in the examples described with reference to embodiments disclosed in this specification can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional unit division may be performed on the device based on the foregoing method example. For example, each functional unit may be obtained through division based on a corresponding function, or two or more functions may be integrated into one unit. The integrated unit may be implemented in a form of hardware, or may be implemented in a form of a software functional unit.

Figure 7:
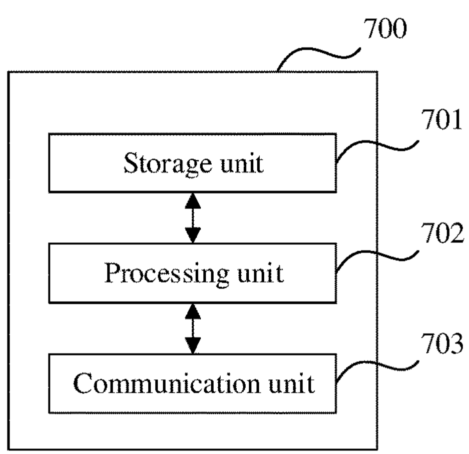
FIG. 7 is a block diagram of a possible example of an apparatus according to an embodiment of this application.

When an integrated unit is used, FIG. 7 is a block diagram of a possible example of an apparatus according to an embodiment of this application. As shown in FIG. 7, the apparatus 700 may include a processing unit 702 and a communication unit 703. The processing unit 702 is configured to control and manage an action of the apparatus 700. The communication unit 703 is configured to support the apparatus 700 in communicating with another device. Optionally, the communication unit 703 is also referred to as a transceiver unit, and may include a receiving unit and/or a sending unit, respectively configured to perform a receiving operation and a sending operation. Optionally, the apparatus 700 may further include a storage unit 701, configured to store program code and/or data of the apparatus 700.

The apparatus 700 may be the first terminal device in the foregoing embodiment, or may be a chip disposed in the first terminal device. The processing unit 702 may support the apparatus 700 in performing an action of the first terminal device in the foregoing method example. Alternatively, the processing unit 702 mainly performs an internal action of the first terminal device in the method example, and the communication unit 703 may support the apparatus 700 in communicating with another device.

Specifically, in an embodiment, the processing unit 702 is configured to determine a candidate relay device, where the candidate relay device includes at least one relay device. The communication unit 703 is configured to send a first message to a second terminal device, where the first message is used to request to change a relay device, and the first message includes an identifier of the candidate relay device.

In a possible design, the communication unit 703 is specifically configured to send the first message to the second terminal device via a first relay device.

In a possible design, the first message further includes a status of a signal between the candidate relay device and the first terminal device and/or an address of the candidate relay device.

In a possible design, the processing unit 703 is specifically configured to determine, based on a status of a signal between a third terminal device and the first terminal device, that the candidate relay device includes the third terminal device, where the signal status includes signal quality and/or signal strength.

In a possible design, the processing unit 703 is specifically configured to determine, based on the status of the signal between the third terminal device and the first terminal device and a status of a signal between the first relay device and the first terminal device, that the candidate relay device includes the third terminal device; or determine, based on the status of the signal between the third terminal device and the first terminal device, a status of a signal between the first relay device and the first terminal device, and a status of a communication link between the third terminal device and the second terminal device, that the candidate relay device includes the third terminal device, where the communication link status includes there is the communication link or there is no communication link.

In a possible design, the processing unit 702 is further configured to obtain the status of the signal between the third terminal device and the first terminal device.

In a possible design, the communication unit 703 is further configured to send a third message, where the third message is used to discover a relay device; and receive a fourth message from the third terminal device, where the fourth message is used to respond to the third message. The processing unit 702 is further configured to determine the status of the signal between the third terminal device and the first terminal device based on the fourth message.

In a possible design, the communication unit 703 is further configured to receive a fifth message from the third terminal device, where the fifth message indicates that the third terminal device supports relay communication. The communication unit 703 is further configured to determine the status of the signal between the third terminal device and the first terminal device based on the fifth message.

In a possible design, the processing unit 702 is further configured to obtain the status of the communication link between the third terminal device and the second terminal device.

In a possible design, the communication unit 703 is further configured to receive the fifth message from the third terminal device, where the fifth message includes an identifier of the second terminal device, and the fifth message indicates that the third terminal device supports relay communication and there is the communication link between the third terminal device and the second terminal device. The processing unit 702 is further configured to determine the status of the communication link between the third terminal device and the second terminal device based on the fifth message.

The apparatus 700 may be the third terminal device in the foregoing embodiment, or may be a chip disposed in the third terminal device. The processing unit 702 may support the apparatus 700 in performing an action of the third terminal device in the foregoing method example. Alternatively, the processing unit 702 mainly performs an internal action of the third terminal device in the method example, and the communication unit 703 may support the apparatus 700 in communicating with another device.

Specifically, in an embodiment, the processing unit 702 is configured to obtain an identifier of at least one terminal device that has a communication link with the third terminal device. The communication unit 703 is configured to send a fifth message, where the fifth message includes the identifier of the at least one terminal device, and the fifth message indicates that the third terminal device supports relay communication and there is the communication link between the third terminal device and the at least one terminal device.

The apparatus 700 may be the second terminal device in the foregoing embodiment, or may be a chip disposed in the second terminal device. The processing unit 702 may support the apparatus 700 in performing an action of the second terminal device in the foregoing method example. Alternatively, the processing unit 702 mainly performs an internal action of the second terminal device in the method example, and the communication unit 703 may support the apparatus 700 in communicating with another device.

Specifically, in an embodiment, the communication unit 703 is configured to receive a first message from a first terminal device, where the first message is used to request to change a relay device, the first message includes an identifier of a candidate relay device, and the candidate relay device includes at least one relay device; and send indication information to the first terminal device based on the first message, where the indication information indicates to change a relay device between the second terminal device and the first terminal device to a second relay device, and the candidate relay device includes the second relay device.

In a possible design, the candidate relay device includes at least two relay devices, and the processing unit 702 is further configured to determine the second relay device based on statuses of signals between the at least two relay devices and the second terminal device.

In a possible design, the communication unit 703 is specifically configured to send the indication information to the first terminal device based on a status of a signal between the second relay device and the second terminal device and a status of a signal between the first relay device and the second terminal device.

In a possible design, the candidate relay device includes at least two relay devices, and the first message further includes a status of a signal between the candidate relay device and the first terminal device. The processing unit 702 is further configured to determine the second relay device based on the status of the signal between the candidate relay device and the first terminal device and a status of a signal between the candidate relay device and the second terminal device.

In a possible design, the processing unit 702 is further configured to obtain the status of the signal between the candidate relay device and the second terminal device.

In a possible design, the communication unit 703 is further configured to broadcast a request message, where the request message includes an identifier of a first candidate relay device, and the first candidate relay device is any relay device in the candidate relay device; and receive a response message from the first candidate relay device. The processing unit 702 is further configured to determine a status of a signal between the first candidate relay device and the second terminal device based on the response message.

In a possible design, the first message further includes an address of the candidate relay device. The communication unit 703 is further configured to send a request message to a second candidate relay device based on an address of the second candidate relay device, where the second candidate relay device is any relay device in the candidate relay device; and receive a response message from the second candidate relay device. The processing unit 702 is further configured to determine a status of a signal between the second candidate relay device and the second terminal device based on the response message.

In a possible design, the communication unit 703 is further configured to receive a fifth message from a third candidate relay device, where the fifth message indicates that the third candidate relay device supports relay communication, and the third candidate relay device is any relay device in the candidate relay device. The processing unit 702 is further configured to determine a status of a signal between the third candidate relay device and the second terminal device based on the fifth message.

It should be understood that division of units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, units may be separately disposed processing elements, or may be integrated into a chip of the apparatus for implementation. In addition, the units may be stored in a memory in a program form, and is invoked by a processing element of the apparatus to perform functions of the units. In addition, such units may be integrated together or may be individually implemented. The processing element herein may also be referred to as a processor, and may be an integrated circuit having a signal processing capability. In an implementation process, operations in the foregoing methods or the foregoing units may be implemented by using a hardware integrated logic circuit in the processor element, or may be implemented in a form in which the processing element invokes software.

In an example, a unit in any one of the foregoing apparatuses may be one or more integrated circuits configured to implement the foregoing methods, for example, one or more application-specific integrated circuits (ASICs), one or more microprocessors (DSPs), one or more field programmable gate arrays (FPGAs), or a combination of at least two of these forms of integrated circuits. For another example, when the units in the apparatus may be implemented in a form in which a processing element schedules a program, the processing element may be a processor, for example, a general-purpose central processing unit (CPU) or another processor that can invoke the program. For another example, the units may be integrated together and implemented in a form of a system-on-a-chip (SOC).

The foregoing unit configured for receiving is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing unit configured for sending is an interface circuit of the apparatus, and is configured to send a signal to another apparatus. For example, when the apparatus is implemented in the manner of the chip, the sending unit is an interface circuit that is of the chip and that is configured to send a signal to another chip or apparatus.

Figure 8:
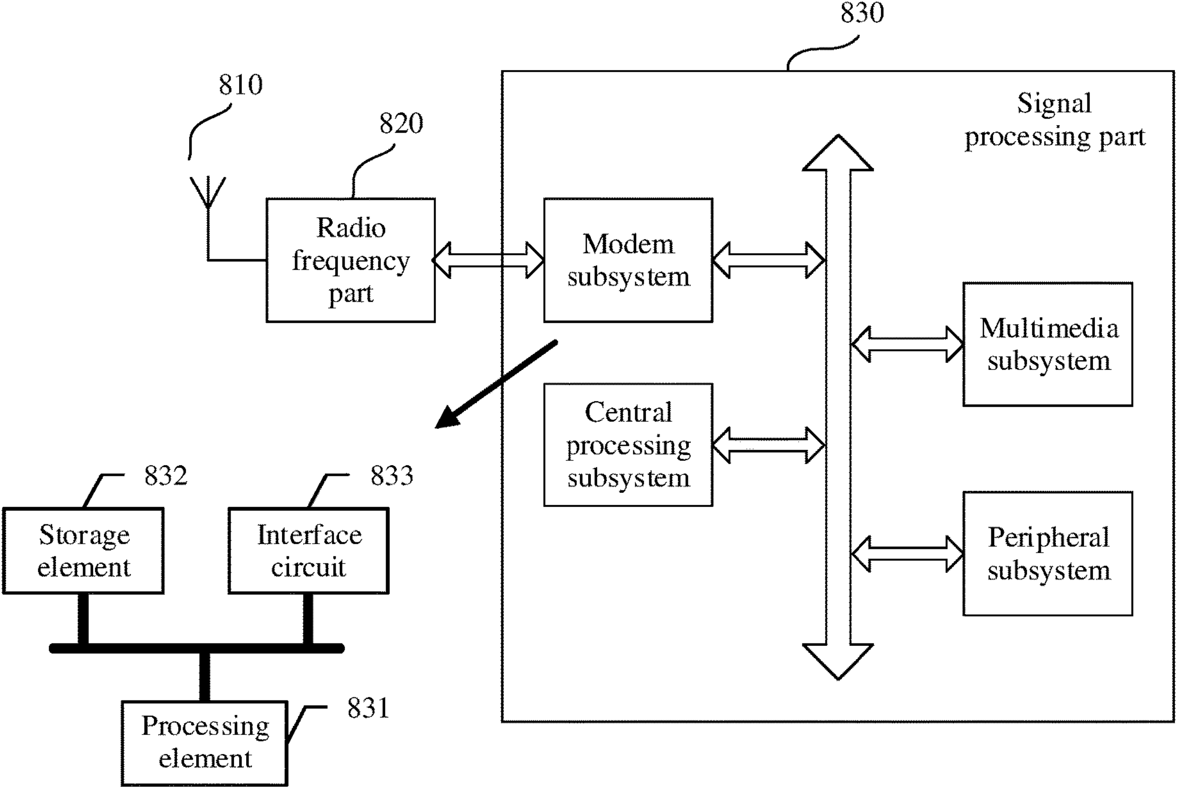
FIG. 8 is a schematic diagram of a structure of a terminal device according to an embodiment of this application.

FIG. 8 is a schematic diagram of a structure of a terminal device according to an embodiment of this application. The terminal device may be the first terminal device, the second terminal device, the relay device, or the like in the foregoing embodiment, and is configured to implement operations of various devices in the foregoing embodiment. As shown in FIG. 8, the terminal device includes an antenna 810, a radio frequency part 820, and a signal processing part 830. The antenna 810 is connected to the radio frequency part 820. In a downlink direction, the radio frequency part 820 receives, through the antenna 810, information sent by a network device, and sends, to the signal processing part 830, the information sent by the network device for processing. In an uplink direction, the signal processing part 830 processes information from the terminal device, and sends the information to the radio frequency part 820. The radio frequency part 820 processes the information from the terminal device, and then sends the processed information to the network device through the antenna 810.

The signal processing part 830 may include a modem subsystem, configured to implement processing of data at each communication protocol layer. The signal processing part 830 may further include a central processing subsystem, configured to implement processing of an operating system and an application layer of the terminal device. In addition, the signal processing part 830 may further include another subsystem, for example, a multimedia subsystem or a peripheral subsystem. The multimedia subsystem is configured to control a camera, a screen display, and the like of the terminal device, and the peripheral subsystem is configured to implement a connection to another device. The modem subsystem may be a separately disposed chip.

The modem subsystem may include one or more processing elements 831, for example, include a main control CPU and another integrated circuit. In addition, the modem subsystem may further include a storage element 832 and an interface circuit 833. The storage element 832 is configured to store data and a program. However, the program used to perform the methods performed by the terminal device in the foregoing methods may not be stored in the storage element 832, but is stored in a memory outside the modem subsystem, and is loaded and used by the modem subsystem when to be used. The interface circuit 833 is configured to communicate with another subsystem.

The modem subsystem may be implemented by using a chip. The chip includes at least one processing element and an interface circuit. The processing element is configured to perform the steps of any method performed by the terminal device. The interface circuit is configured to communicate with another apparatus. In an implementation, units of the terminal device that implement the steps in the foregoing methods may be implemented by a program scheduled by a processing element. For example, the apparatus used for the terminal device includes a processing element and a storage element. The processing element invokes a program stored in the storage element, to perform the method performed by the terminal device in the foregoing method embodiment. The storage element may be a storage element whose processing element is located on a same chip, that is, an on-chip storage element.

In another implementation, the program used to perform the method performed by the terminal device in the foregoing method may be in a storage element located on a different chip from the processing element, that is, an off-chip storage element. In this case, the processing element invokes or loads the program from the off-chip storage element to the on-chip storage element, to invoke and perform the method performed by the terminal device in the foregoing method embodiment.

In still another implementation, units of the terminal device that implement the steps in the foregoing method may be configured as one or more processing elements. The processing elements are disposed in the modem subsystem. The processing element herein may be an integrated circuit, for example, one or more ASICs, one or more DSPs, one or more FPGAs, or a combination of the types of integrated circuits. The integrated circuits may be integrated together to form a chip.

Units of the terminal device that implement the steps in the foregoing method may be integrated together, and implemented in a form of SOC. The SOC chip is configured to implement the foregoing method. At least one processing element and a storage element may be integrated into the chip, and the processing element invokes a program stored in the storage element to implement the foregoing method performed by the terminal device. Alternatively, at least one integrated circuit may be integrated into the chip, to implement the foregoing method performed by the terminal device. Alternatively, with reference to the foregoing implementations, functions of some units may be implemented by a program invoked by the processing element, and functions of some units are implemented by the integrated circuit.

It can be learned that the foregoing apparatus used for the terminal device may include at least one processing element and an interface circuit. The at least one processing element is configured to perform any one of the methods that are performed by the terminal device and that are provided in the foregoing method embodiments. The processing element may perform some or all steps performed by the terminal device, in a first manner, to be specific, by invoking the program stored in the storage element; or may perform some or all steps performed by the terminal device, in a second manner, to be specific, by using a hardware integrated logical circuit in the processing element in combination with instructions; or may certainly perform, by combining the first manner and the second manner, some or all steps performed by the terminal device.

The processing element herein is the same as that described above, and may be implemented by using a processor. A function of the processing element may be the same as a function of the processing unit described in FIG. 7. For example, the processing element may be a general-purpose processor, for example, a CPU, or may be one or more integrated circuits configured to implement the foregoing method, for example, one or more ASICs, one or more microprocessors DSPs, or one or more FPGAs, or a combination of at least two of the integrated circuit forms. The storage element may be implemented by using a memory, and a function of the storage element may be the same as a function of the storage unit described in FIG. 7. The storage element may be a memory, or may be a general name of a plurality of memories.

The terminal device shown in FIG. 8 can implement processes related to the terminal device in the foregoing method embodiment. Operations and/or functions of modules in the terminal device shown in FIG. 8 are respectively intended to implement corresponding procedures in the foregoing method embodiment. For details, refer to the descriptions in the foregoing method embodiments. To avoid repetition, detailed descriptions are properly omitted herein.

The terms "system" and "network" may be used interchangeably in embodiments of this application. The term "at least one" means one or more, and the term "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one item (piece) of the following" or a similar expression thereof means any combination of the items, including any combination of singular items (pieces) or plural items (pieces). For example, "at least one of A, B, and C" includes A, B, C, AB, AC, BC, or ABC. In addition, unless otherwise specified, ordinal numbers such as "first" and "second" mentioned in embodiments of this application are used to distinguish between a plurality of objects, but are not used to limit a sequence, a time sequence, priorities, or importance of the plurality of objects.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

The computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may be loaded onto the computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams. It is clear that a person skilled in the art can make various modifications and variations to this application without departing from the spirit and scope of this application. This application is intended to cover the modifications and variations of this application provided that they fall within the scope of the following claims and equivalent technologies of this application.

What is claimed is:

1. A communication method performed by a first terminal device or a chip in the first terminal device, comprising:

determining a candidate relay device set, wherein the candidate relay device set comprises at least one candidate relay device, and a status of a signal between the at least one candidate relay device and the first terminal device satisfies a first preset condition; and sending a first message to a second terminal device, wherein the first terminal device and the second terminal device perform relay communication via a first relay device, wherein the first message comprises an identifier of the at least one candidate relay device, a relay reselection indication indicating to change a relay device, and an address of the at least one candidate relay device, wherein the address of the at least one candidate relay device is for obtaining a status of a communication link between the second terminal device and the at least one candidate relay device, and the address of the at least one candidate relay device is a layer 2 identifier; and receiving indication information from the second terminal device based on the first message, wherein the indication information indicates to change a relay device between the second terminal device and the first terminal device to a second relay device, wherein the at least one candidate relay device comprises the second relay device, the indication information comprises an identifier of the second relay device, and the indication information is carried by a link modification request message.

2. The method according to claim 1, wherein the sending a first message to the second terminal device comprises:

sending the first message to the second terminal device via the first relay device.

3. The method according to claim 1, wherein the determining the candidate relay device set comprises:

determining, based on a status of a signal between a third terminal device and the first terminal device, that the candidate relay device set comprises the third terminal device, wherein the status of the signal comprises at least one of signal quality or signal strength.

4. The method according to claim 3, wherein determining, based on the status of the signal between the third terminal device and the first terminal device, that the at least one candidate relay device comprises the third terminal device comprises:

determining, based on the status of the signal between the third terminal device and the first terminal device and based on a status of a signal between the first relay device and the first terminal device, that the at least one candidate relay device comprises the third terminal device; or determining, based on the status of the signal between the third terminal device and the first terminal device, a status of a signal between the first relay device and the first terminal device, and a status of a communication link between the third terminal device and the second terminal device, that the at least one candidate relay device comprises the third terminal device, wherein the communication link status comprises either the communication link exists or communication link does not exist.

5. The method according to claim 4, wherein the method further comprises:

obtaining the status of the signal between the third terminal device and the first terminal device.

6. The method according to claim 4, wherein the method further comprises:

obtaining the status of the communication link between the third terminal device and the second terminal device.

7. The method according to claim 1, wherein the status of the signal comprises at least one of signal quality or signal strength of an announcement message received from the at least one candidate relay device.

8. The method according to claim 1, wherein the status of the signal comprises at least one of signal quality or signal strength of a response message to a discovery message received from the at least one candidate relay device.

9. A communication method performed by a second terminal device or a chip in the second terminal device, comprising:

receiving a first message from a first terminal device, wherein the second terminal device and the first terminal device perform relay communication via a first relay device, wherein the first message comprises an identifier of at least one candidate relay device, a relay reselection indication indicating to change a relay device, and an address of the at least one candidate relay device, and the address of the at least one candidate relay device is a layer 2 identifier, wherein a status of a signal between the at least one candidate relay device and the first terminal device satisfies a first preset condition;

obtaining, based on the address of the at least one candidate relay device, a status of a signal between the at least one candidate relay device and the second terminal device;

determining, based on the status of the signal between each of the at least one candidate relay device and the second terminal device, a second relay device from the at least one candidate relay device; and sending indication information to the first terminal device, wherein the indication information indicates to change a relay device between the second terminal device and the first terminal device to the second relay device, the indication information comprises an identifier of the second relay device, and the indication information is carried by a link modification request message.

10. The method according to claim 9, wherein the obtaining, based on the address of the at least one candidate relay device, a status of a signal between the at least one candidate relay device and the second terminal device comprises:

sending a request message to a second candidate relay device based on an address of the second candidate relay device, wherein the second candidate relay device is any relay device in the at least one candidate relay device;

receiving a response message from the second candidate relay device; and determining a status of a signal between the second candidate relay device and the second terminal device based on the response message.

11. The method according to claim 9, wherein the sending indication information to the first terminal device comprises sending the indication information to the second terminal device via the first relay device.

12. A communication apparatus, comprising:

at least one processor; and a non-transitory computer-readable storage medium storing a program to be executed by the at least one processor, the program including instructions for:

determining a candidate relay device set, wherein the candidate relay device set comprises at least one candidate relay device, and a status of a signal between the at least one relay device and the communication apparatus satisfies a first preset condition; and sending a first message to a second terminal device, wherein the second terminal device and the communication apparatus perform relay communication via a first relay device, wherein the first message comprises an identifier of the at least one candidate relay device, a relay reselection indication indicating to change a relay device, and an address of the at least one candidate relay device, wherein the address of the at least one candidate relay device is for obtaining a status of a communication link between the second terminal device and the at least one candidate relay device, and the address of the at least one candidate relay device is a layer 2 identifier; and receiving indication information from the second terminal device based on the first message, wherein the indication information indicates to change a relay device between the second terminal device and the communication apparatus to a second relay device, wherein the at least one candidate relay device comprises the second relay device, the indication information comprises an identifier of the second relay device, and the indication information is carried by a link modification request message.

13. The communication apparatus according to claim 12, wherein the instructions further include instructions to:

send the first message to the second terminal device via the first relay device.

14. The communication apparatus according to claim 12, wherein the first message further comprises at least one of a status of a signal between the at least one candidate relay device and the communication apparatus or an address of the at least one candidate relay device.

15. The communication apparatus according to claim 12, wherein the instructions further include instructions to:

determine, based on a status of a signal between a third terminal device and the apparatus, that the candidate relay device set comprises the third terminal device, wherein the status of the signal comprises at least one of signal quality or signal strength.

16. A communication apparatus, comprising:

at least one processor; and a non-transitory computer-readable storage medium storing a program to be executed by the at least one processor, the program including instructions for:

receiving a first message from a first terminal device, wherein the first terminal device and the communication apparatus perform relay communication via a first relay device, wherein the first message comprises an identifier of at least one candidate relay device, a relay reselection indication indicating to change a relay device, and an address of the at least one candidate relay device, and the address of the at least one candidate relay device is a layer 2 identifier, wherein a status of a signal between the at least one candidate relay device and the first terminal device satisfies a first preset condition;

obtaining, based on the address of the at least one candidate relay device, a status of a signal between the at least one candidate relay device and a second terminal device;

determining, based on the status of the signal between each of the at least one candidate relay device and the second terminal device, a second relay device from the at least one candidate relay device; and sending indication information to the first terminal device, wherein the indication information indicates to change a relay device between the communication apparatus and the first terminal device to the second relay device, the indication information comprises an identifier of the second relay device, the indication information is carried by a link modification request message.

17. The communication apparatus according to claim 16, wherein the at least one candidate relay device comprises at least two relay devices, and the instructions further include instructions to:

determine the second relay device based on statuses of signals between the at least two relay devices and the communication apparatus.

18. The communication apparatus according to claim 17, wherein the instructions further include instructions to:

send the indication information to the first terminal device based on a status of a signal between the second relay device and the communication apparatus and based on a status of a signal between the first relay device and the communication apparatus.

19. The communication apparatus according to claim 16, wherein the at least one candidate relay device comprises at least two relay devices, the first message further comprises a status of a signal between the at least one candidate relay device and the first terminal device, and the instructions further include instructions to:

determine the second relay device based on the status of the signal between the at least one candidate relay device and the first terminal device and based on a status of a signal between the at least one candidate relay device and the communication apparatus.

20. The communication apparatus according to claim 16, wherein the instructions further include instructions to:

send a request message to a second candidate relay device based on an address of the second candidate relay device, wherein the second candidate relay device is any relay device in the at least one candidate relay device;

receive a response message from the second candidate relay device; and determine a status of a signal between the second candidate relay device and the second terminal device based on the response message.

21. The communication apparatus according to claim 16, wherein the instructions further include instructions to send the indication information to the second terminal device via the first relay device.

* * * * *